US009591612B2

(12) United States Patent
Merlin et al.

(10) Patent No.: US 9,591,612 B2
(45) Date of Patent: Mar. 7, 2017

(54) SYSTEMS AND METHODS FOR LOW OVERHEAD PAGING

(71) Applicant: QUALCOMM Incorporated, San Diego, CA (US)

(72) Inventors: Simone Merlin, San Diego, CA (US); Maarten Menzo Wentink, Breukelen (NL); Zhi Quan, San Diego, CA (US); Alfred Asterjadhi, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/691,341

(22) Filed: Nov. 30, 2012

(65) Prior Publication Data

US 2013/0141215 A1 Jun. 6, 2013

Related U.S. Application Data

(60) Provisional application No. 61/566,998, filed on Dec. 5, 2011, provisional application No. 61/589,441, filed
(Continued)

(51) Int. Cl.
*H03M 7/30* (2006.01)
*H04W 68/02* (2009.01)
(Continued)

(52) U.S. Cl.
CPC .......... *H04W 68/02* (2013.01); *H04W 28/06* (2013.01); *H04W 52/0209* (2013.01); *H04W 52/0212* (2013.01)

(58) Field of Classification Search
CPC combination set(s) only.
See application file for complete search history.

(56) References Cited

U.S. PATENT DOCUMENTS 5,396,228 A 3/1995 Garahi
6,100,824 A * 8/2000 MacLeod et al. .............. 341/51
(Continued)

FOREIGN PATENT DOCUMENTS

EP 1892903 A1 2/2008
EP 1968226 A1 9/2008
(Continued)

OTHER PUBLICATIONS

International Search Report and Written Opinion—PCT/US2012/068009—ISA/EPO—Mar. 22, 2013.
(Continued)

*Primary Examiner* — Brian Zimmerman
*Assistant Examiner* — Cal Eustaquio
(74) *Attorney, Agent, or Firm* — Eric Ho

(57) ABSTRACT

Systems and methods for low overhead paging in a wireless communications network are described herein. In some aspects, an apparatus for wireless communication includes a receiver and a processor. The receiver receives a request from a first device. The request indicates a first period of a plurality of periods corresponding to a periodicity for transmitting paging messages. The processor assigns the first device to a group scheduled to receive paging messages at most every first period based on the request and determines a start time for transmitting paging messages to the first device based on schedules for transmitting paging messages to a plurality of other devices. In other aspects, an apparatus for wireless communication includes a processor and memory. The processor derives an information sub-unit from an information unit associated with a paging message, compresses the information sub-unit, and generates a second information unit associated with the method of compression.

22 Claims, 20 Drawing Sheets

Related U.S. Application Data on Jan. 23, 2012, provisional application No. 61/591,836, filed on Jan. 27, 2012, provisional application No. 61/598,193, filed on Feb. 13, 2012, provisional application No. 61/605,261, filed on Mar. 1, 2012.

(51) Int. Cl.
*H04W 52/02* (2009.01)
*H04W 28/06* (2009.01)

(56) References Cited

U.S. PATENT DOCUMENTS

| | | | |
|---|---|---|---|
| 6,154,648 A | 11/2000 | Comer | |
| 6,400,289 B1* | 6/2002 | Banerji | 341/60 |
| 7,583,644 B2 | 9/2009 | Morioka et al. | |
| 7,715,855 B2 | 5/2010 | Subrahmanya | |
| 7,916,687 B2 | 3/2011 | Deshpande et al. | |
| 8,180,381 B1 | 5/2012 | Shetty et al. | |
| 8,213,965 B2 | 7/2012 | Park et al. | |
| 2001/0031092 A1* | 10/2001 | Zeck et al. | 382/239 |
| 2002/0025811 A1 | 2/2002 | Willey | |
| 2002/0057213 A1* | 5/2002 | Heath | 341/51 |
| 2003/0212876 A1* | 11/2003 | Chung et al. | 711/220 |
| 2005/0232200 A1 | 10/2005 | Jeong et al. | |
| 2006/0234676 A1 | 10/2006 | Harris et al. | |
| 2007/0015523 A1 | 1/2007 | Prakash et al. | |
| 2007/0171819 A1 | 7/2007 | Julian et al. | |
| 2008/0014882 A1 | 1/2008 | Tsai et al. | |
| 2008/0057984 A1 | 3/2008 | Willey | |
| 2008/0081613 A1 | 4/2008 | Yang et al. | |
| 2008/0146253 A1 | 6/2008 | Wentink | |
| 2008/0182596 A1 | 7/2008 | Wang et al. | |
| 2008/0220769 A1 | 9/2008 | Qi et al. | |
| 2008/0220770 A1 | 9/2008 | Qi et al. | |
| 2008/0311933 A1 | 12/2008 | Lim et al. | |
| 2009/0016306 A1 | 1/2009 | Wang et al. | |
| 2009/0046637 A1 | 2/2009 | Kim et al. | |
| 2009/0080351 A1 | 3/2009 | Ryu et al. | |
| 2009/0196249 A1* | 8/2009 | Kawamura et al. | 370/330 |
| 2009/0225709 A1* | 9/2009 | Wager et al. | 370/329 |
| 2010/0046482 A1 | 2/2010 | Sridhara et al. | |
| 2010/0054154 A1 | 3/2010 | Lambert et al. | |
| 2010/0081454 A1 | 4/2010 | Wang et al. | |
| 2010/0093378 A1 | 4/2010 | Chin et al. | |
| 2010/0214942 A1 | 8/2010 | Du et al. | |
| 2010/0215030 A1 | 8/2010 | Agrawal et al. | |
| 2010/0261487 A1 | 10/2010 | Razdan | |
| 2011/0013554 A1 | 1/2011 | Koskinen | |
| 2011/0039553 A1 | 2/2011 | Willey | |
| 2011/0065467 A1 | 3/2011 | Park et al. | |
| 2011/0076960 A1 | 3/2011 | Yun et al. | |
| 2011/0105154 A1 | 5/2011 | Kim | |
| 2011/0117852 A1 | 5/2011 | Copeland et al. | |
| 2011/0128911 A1 | 6/2011 | Shaheen | |
| 2012/0157145 A1 | 6/2012 | Lee et al. | |
| 2012/0270574 A1 | 10/2012 | Nishida et al. | |
| 2012/0300655 A1 | 11/2012 | Lee et al. | |
| 2013/0143606 A1 | 6/2013 | Merlin et al. | |
| 2013/0208667 A1 | 8/2013 | Merlin et al. | |
| 2014/0146678 A1 | 5/2014 | Merlin et al. | |

FOREIGN PATENT DOCUMENTS

| | | |
|---|---|---|
| GB | 2415573 | 12/2005 |
| JP | 2007043601 A | 2/2007 |
| JP | 2009273177 A | 11/2009 |
| JP | 2010109676 A | 5/2010 |
| JP | 2010517478 A | 5/2010 |
| JP | 2013509800 A | 3/2013 |
| WO | WO-2005072001 A2 | 8/2005 |
| WO | WO-2006011775 A2 | 2/2006 |
| WO | WO-2007086705 A1 | 8/2007 |
| WO | WO-2008084949 A1 | 7/2008 |
| WO | WO-2008153343 A1 | 12/2008 |
| WO | WO-2009008456 A1 | 1/2009 |
| WO | WO-2010025678 A1 | 3/2010 |
| WO | WO-2011053219 A1 | 5/2011 |
| WO | WO-2012077952 A2 | 6/2012 |

OTHER PUBLICATIONS

Park M. (Intel): "TGah SFD D12.X; 11-13-0130-00-00ah-tgah-sfd-d12-x", IEEE SA Mentor; 11-13-0130-00-00AH-TGAH-SFD-D12-X, IEEE-SA Mentor, Piscataway, NJ USA, vol. 802.11ah, Jan. 16, 2013, pp. 1-58, XP068040532.

* cited by examiner

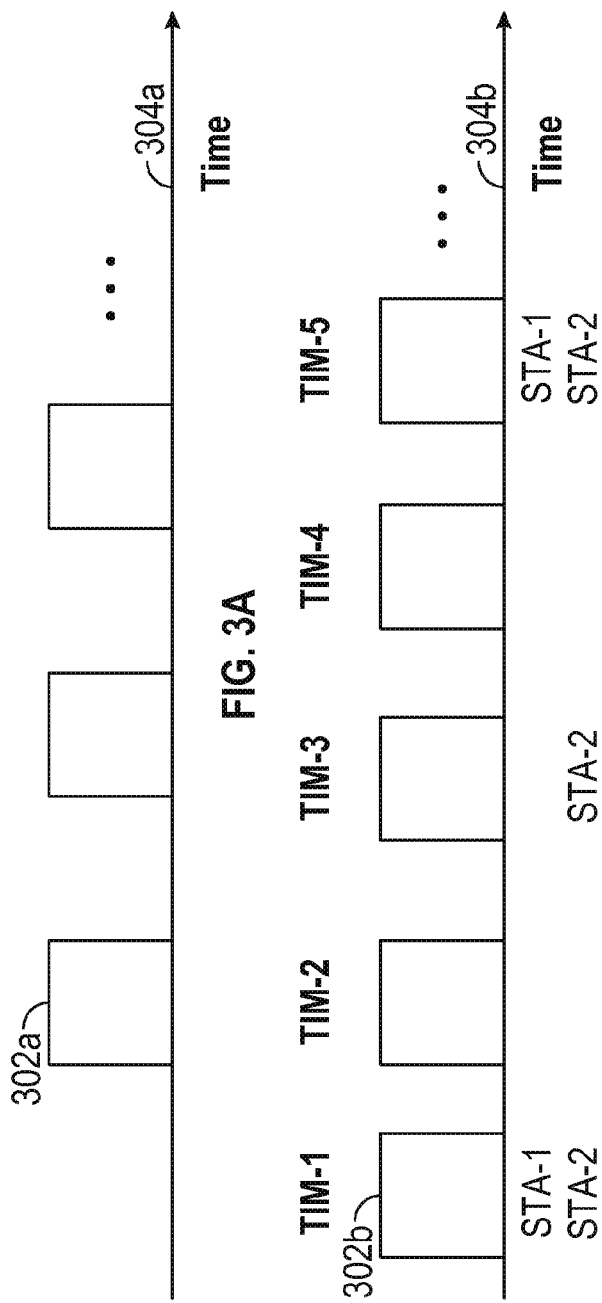
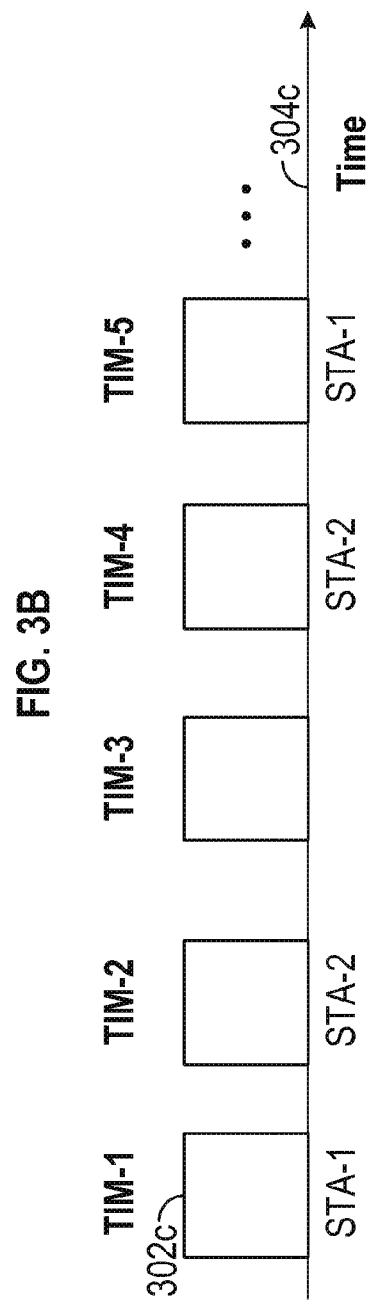
FIG. 3A
FIG. 3B
FIG. 3C

2400

| EID | LEN | Control (optional) | Sub-bitmap1 | • • • | Sub-bitmapN |
|---|---|---|---|---|---|
| 1Byte | 1Byte | 1Byte | Var. | Var. | Var. |
| 2405 | 2410 | 2415 | 2420 | 2420 | 2420 |

| Offset | Length | Bitmap |
|---|---|---|
| e.g. 13Bits | e.g. 3Bits | e.g. 0 to 7Bytes |
| 2421 | 2422 | 2423 |

| EID | LEN | Control (optional) | Compressed TIM IE |
|---|---|---|---|
| 1Byte | 1Byte | 1Byte | Var. |
| 2505 | 2510 | 2515 | 2520 |

2705 — Define a sub-bitmap element

2710 — Insert in sub-bitmap element information directed at identifying the index of a paged receiver 2715 — Insert in sub-bitmap element a variable length bitmap 2720 — Transmit one or more sub-bitmap elements in a single paging message

2755 — Receive a bitmap to be compressed

2760 — Compress the bitmap by obtaining running length sequences

2765 — Define an information element

2770 — Insert in information element the running length sequences

2775 — Insert in information element information relative to the running length sequences

FIG. 27B

SYSTEMS AND METHODS FOR LOW OVERHEAD PAGING

CROSS REFERENCE TO RELATED APPLICATIONS

This application claims benefit under 35 U.S.C. §119(e) to U.S. Provisional Patent Application No. 61/566,998 entitled "SYSTEMS AND METHODS FOR LOW OVERHEAD PAGING" filed on Dec. 5, 2011, the disclosure of which is hereby incorporated by reference in its entirety. This application additionally claims benefit under 35 U.S.C. §119(e) to U.S. Provisional Patent Application No. 61/589,441 entitled "SYSTEMS AND METHODS FOR LOW OVERHEAD PAGING" filed on Jan. 23, 2012, the disclosure of which is hereby incorporated by reference in its entirety. This application additionally claims benefit under 35 U.S.C. §119(e) to U.S. Provisional Patent Application No. 61/591,836 entitled "SYSTEMS AND METHODS FOR LOW OVERHEAD PAGING" filed on Jan. 27, 2012, the disclosure of which is hereby incorporated by reference in its entirety. This application additionally claims benefit under 35 U.S.C. §119(e) to U.S. Provisional Patent Application No. 61/598,193 entitled "SYSTEMS AND METHODS FOR LOW OVERHEAD PAGING" filed on Feb. 13, 2012, the disclosure of which is hereby incorporated by reference in its entirety. This application additionally claims benefit under 35 U.S.C. §119(e) to U.S. Provisional Patent Application No. 61/605,261 entitled "SYSTEMS AND METHODS FOR LOW OVERHEAD PAGING" filed on Mar. 1, 2012, the disclosure of which is hereby incorporated by reference in its entirety.

FIELD

The present application relates generally to wireless communications, and more specifically to systems, methods, and devices for performing low overhead paging in a wireless communication network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit/receive information between one another. Devices that are not actively transmitting/receiving information in the wireless network may enter a doze state to conserve power and may not actively transmit/receive information. At a later time, devices in the doze state may again enter an awake state in order to transmit/receive data, such as paging messages.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides an apparatus for wireless communication that includes a receiver and a processor. The receiver is configured to receive a request from a first device. The request indicates a first period of a plurality of periods corresponding to a periodicity for transmitting paging messages. The processor is configured to assign the first device to a group scheduled to receive paging messages at most every first period based on the request, and determine a start time for transmitting paging messages to the first device based on schedules for transmitting paging messages to a plurality of other devices.

The apparatus of the preceding paragraph can include a combination of one or more of the following features: The processor is further configured to select the start time based at least in part on a number of the plurality of other devices that are scheduled to receive paging messages at the start time. The schedules for transmitting paging messages to the plurality of other devices are determined based on requests from the plurality of other devices. A transmitter configured to transmit a response to the first device, the response indicating the start time. The request comprises a request frame, the request frame comprising a requested interval field configured to indicate the first period, a maximum interval field configured to indicate a maximum periodicity for receiving paging messages at the first device, and a traffic class field configured to indicate filter constraints for transmitting paging messages to the first device. The response comprises a response frame, the response frame comprising a status field configured to indicate whether the apparatus will transmit paging messages to the first device, a granted interval field configured to indicate a granted periodicity for transmitting paging messages to the first device, a group field configured to identify the group, a counter field configured to indicate a number of periods for transmitting paging messages until the start time, and an identification field configured to uniquely identify the response. The processor is further configured to determine the start time based on when the plurality of other devices are configured to transmit polling messages, the polling messages configured to request data buffered at the apparatus. The periodicity corresponds to a periodicity that the apparatus is configured to transmit a beacon frame comprising a traffic indication map. Each paging message comprises a number of groups field configured to indicate a number of paged groups and a traffic indication map field configured to indicate whether devices of the paged groups have data buffered at the apparatus, and the processor is further configured to compress data contents of the traffic indication map field.

Another aspect of this disclosure provides an apparatus that includes a processor, transmitter, and receiver. The processor is configured to select a first period of a plurality of periods corresponding to a periodicity that an access point is configured to transmit paging messages. The transmitter is configured to transmit a request to the access point, the request indicating selection of the first period. The receiver is configured to receive a response from the access point, the response indicating assignment of a granted periodicity for receiving paging messages and a start time for receiving paging messages, the start time determined by the access point based on schedules for transmitting paging messages to a plurality of other devices.

The apparatus of the preceding paragraph can include a combination of one or more of the following features: The response comprises a response frame, the response frame comprising a status field configured to indicate whether the access point will transmit paging messages to the apparatus, a granted interval field configured to indicate a granted periodicity for transmitting paging messages to the apparatus, a group field configured to identify an assigned group, a counter field configured to indicate a number of periods for transmitting paging messages until the start time, and an identification field configured to uniquely identify the response. The request comprises a request frame, the request frame comprising a requested interval field configured to indicate the first period, a maximum interval field configured to indicate a maximum periodicity for receiving paging messages at the apparatus, and a traffic class field configured to indicate filter constraints for transmitting paging messages to the apparatus. The periodicity corresponds to a periodicity that the access point is configured to transmit a beacon frame comprising a traffic indication map. Each paging message comprises a number of groups field configured to indicate a number of paged groups and a traffic indication map field configured to indicate whether devices of the paged groups have data buffered at the access point, and the processor is further configured to decompress data contents of the traffic indication map field.

One aspect of this disclosure provides a method for wireless communication including: receiving a request from a first device, the request indicating a first period from a plurality of periods corresponding to a periodicity for transmitting paging messages; assigning the first device to a group scheduled to receive paging messages at most every first period based on the request; and determining a start time for transmitting paging messages to the first device based on schedules for transmitting paging messages to a plurality of other devices.

The method of the preceding paragraph can include a combination of one or more of the following features: The method may include selecting the start time based at least in part on a number of the plurality of other devices that are scheduled to receive paging messages at the start time. The method may include determining the schedules for transmitting paging messages to the plurality of other devices based on requests from the plurality of other devices. The method may include transmitting a response to the first device, the response indicating the start time. The request comprises a request frame, the request frame comprising a requested interval field configured to indicate the first period, a maximum interval field configured to indicate a maximum periodicity for receiving paging messages at the first device, and a traffic class field configured to indicate filter constraints for transmitting paging messages to the first device. The response comprises a response frame, the response frame comprising a status field configured to indicate whether an access point will transmit paging messages to the first device, a granted interval field configured to indicate a granted periodicity for transmitting paging messages to the first device, a group field configured to identify the group, a counter field configured to indicate a number of periods for transmitting paging messages until the start time, and an identification field configured to uniquely identify the response. The method may include determining the start time based on when the plurality of other devices are configured to transmit polling messages, the polling messages configured to request data buffered at an access point. The periodicity corresponds to a periodicity for transmitting a beacon frame comprising a traffic indication map. Each paging message comprises a number of groups field configured to indicate a number of paged groups and a traffic indication map field configured to indicate whether devices of the paged groups have data buffered at an access point, and the method may include compressing data contents of the traffic indication map field.

Another aspect of this disclosure includes method for wireless communication including: selecting a first period of a plurality of periods corresponding to a periodicity that an access point is configured to transmit paging messages; transmitting a request to the access point, the request indicating selection of the first period; and receiving a response from the access point, the response indicating assignment of a granted periodicity for receiving paging messages and a start time for receiving paging messages, the start time determined by the access point based on schedules for transmitting paging messages to a plurality of other devices.

The method of the preceding paragraph can include a combination of one or more of the following features: The response comprises a response frame, the response frame comprising a status field configured to indicate whether the access point will transmit paging messages, a granted interval field configured to indicate a granted periodicity for transmitting paging messages, a group field configured to identify an assigned group, a counter field configured to indicate a number of periods for transmitting paging messages until the start time, and an identification field configured to uniquely identify the response. The request comprises a request frame, the request frame comprising a requested interval field configured to indicate the first period, a maximum interval field configured to indicate a maximum periodicity for receiving paging messages, and a traffic class field configured to indicate filter constraints for transmitting paging messages. The periodicity corresponds to a periodicity that the access point is configured to transmit a beacon frame comprising a traffic indication map. Each paging message comprises a number of groups field configured to indicate a number of paged groups and a traffic indication map field configured to indicate whether devices of the paged groups have data buffered at the access point, and the method may include decompressing data contents of the traffic indication map field.

One aspect of this disclosure provides an apparatus for wireless communication comprising: means for receiving a request from a first device, the request indicating a first period from a plurality of periods corresponding to a periodicity for transmitting paging messages; means for assigning the first device to a group scheduled to receive paging messages at most every first period based on the request; and means for determining a start time for transmitting paging messages to the first device based on schedules for transmitting paging messages to a plurality of other devices.

Another aspect of this disclosure provides an apparatus for wireless communication comprising: means for selecting a first period of a plurality of periods corresponding to a periodicity that an access point is configured to transmit paging messages; means for transmitting a request to the access point, the request indicating selection of the first period; and means for receiving a response from the access point, the response indicating assignment of a granted periodicity for receiving paging messages and a start time for receiving paging messages, the start time determined by the access point based on schedules for transmitting paging messages to a plurality of other devices.

One aspect of this disclosure provides a non-transitory computer-readable medium comprising instructions that when executed cause an apparatus to: receive a request from a first device, the request indicating a first period from a plurality of periods corresponding to a periodicity for transmitting paging messages; assign the first device to a group scheduled to receive paging messages at most every first period based on the request; and determine a start time for transmitting paging messages to the first device based on schedules for transmitting paging messages to a plurality of other devices.

Another aspect of this disclosure provides a non-transitory computer-readable medium comprising instructions that when executed cause an apparatus to: select a first period of a plurality of periods corresponding to a periodicity that an access point is configured to transmit paging messages; transmit a request to the access point, the request indicating selection of the first period; and receive a response from the access point, the response indicating assignment of a granted periodicity for receiving paging messages and a start time for receiving paging messages, the start time determined by the access point based on schedules for transmitting paging messages to a plurality of other devices.

One aspect of this disclosure provides an apparatus that includes a processor and memory. The processor is configured to derive a first information sub-unit from a first information unit associated with a paging message, compress the first information sub-unit according to a first method of compression to obtain a first compressed information sub-unit, and generate a second information unit associated with the first method of compression. The memory is configured to store the first compressed information sub-unit and the second information unit.

The apparatus of the preceding paragraph can include a combination of one or more of the following features: A transmitter electronically coupled to the processor and configured to transmit the paging message, the paging message comprising the first compressed information sub-unit and the second information unit. The paging message comprises a sub-unit length field configured to indicate a length of the first compressed information sub-unit. The processor is further configured to: derive a second information sub-unit from the first information unit; compress the second information sub-unit according to a second method of compression to obtain a second compressed information sub-unit; and generate a third information unit associated with the second method of compression. A transmitter electronically coupled to the processor and configured to transmit the paging message, the paging message comprising the first compressed information sub-unit, the second compressed information sub-unit, the second information unit, and the third information unit. The first method of compression is the same as the second method of compression. The second information unit includes an identification of the first compression method. The second information unit includes an indication of an offset size associated with the first compression method. The second information unit includes an indication of a cardinality associated with the first information unit. The paging message comprises a sub-unit length field configured to indicate an individual length of the first compressed information sub-unit and the second compressed information sub-unit.

Another aspect of this disclosure provides a method that comprising: deriving a first information sub-unit from a first information unit associated with a paging message; compressing the first information sub-unit according to a first method of compression to obtain a first compressed information sub-unit; and generating a second information unit associated with the first method of compression.

The method of the preceding paragraph can include a combination of one or more of the following features: The method may include transmitting the paging message, the paging message comprising the first compressed information sub-unit and the second information unit. The paging message comprises a sub-unit length field configured to indicate a length of the first compressed information sub-unit. The method may include: deriving a second information sub-unit from the first information unit; compressing the second information sub-unit according to a second method of compression to obtain a second compressed information sub-unit; and generating a third information unit associated with the second method of compression. The method may include transmitting the paging message, the paging message comprising the first compressed information sub-unit, the second compressed information sub-unit, the second information unit, and the third information unit. The first method of compression is the same as the second method of compression. The second information unit includes an identification of the first compression method. The second information unit includes an indication of an offset size associated with the first compression method. The second information unit includes an indication of a cardinality associated with the first information unit. The paging message comprises a sub-unit length field configured to indicate an individual length of the first compressed information sub-unit and the second compressed information sub-unit.

One aspect of this disclosure provides an apparatus for wireless communication comprising: means for deriving a first information sub-unit from a first information unit associated with a paging message; means for compressing the first information sub-unit according to a first method of compression to obtain a first compressed information sub-unit; and means for generating a second information unit associated with the first method of compression.

Another aspect of this disclosure provides a non-transitory computer-readable medium comprising instructions that when executed cause an apparatus to: derive a first information sub-unit from a first information unit associated with a paging message; compress the first information sub-unit according to a first method of compression to obtain a first compressed information sub-unit; and generate a second information unit associated with the first method of compression.

BRIEF DESCRIPTION OF THE DRAWINGS

FIGS. 3a, 3b, and 3c illustrate a plurality of paging messages transmitted by an access point to wireless stations in the wireless communication system of FIG. 1.

FIGS. 4b and 4c illustrate exemplary TIM field contents for the exemplary paging message of FIG. 4a.

FIG. 24a illustrates an exemplary compressed paging message.

FIG. 24b illustrates an exemplary structure of the compressed paging message of FIG. 24a.

FIG. 25a illustrates another exemplary compressed paging message.

FIG. 25b illustrates an exemplary structure of the compressed paging message of FIG. 25a.

FIG. 27a illustrates another method for compressing the paging message.

FIG. 27b illustrates another method for compressing the paging message.

DETAILED DESCRIPTION

Figure 1:
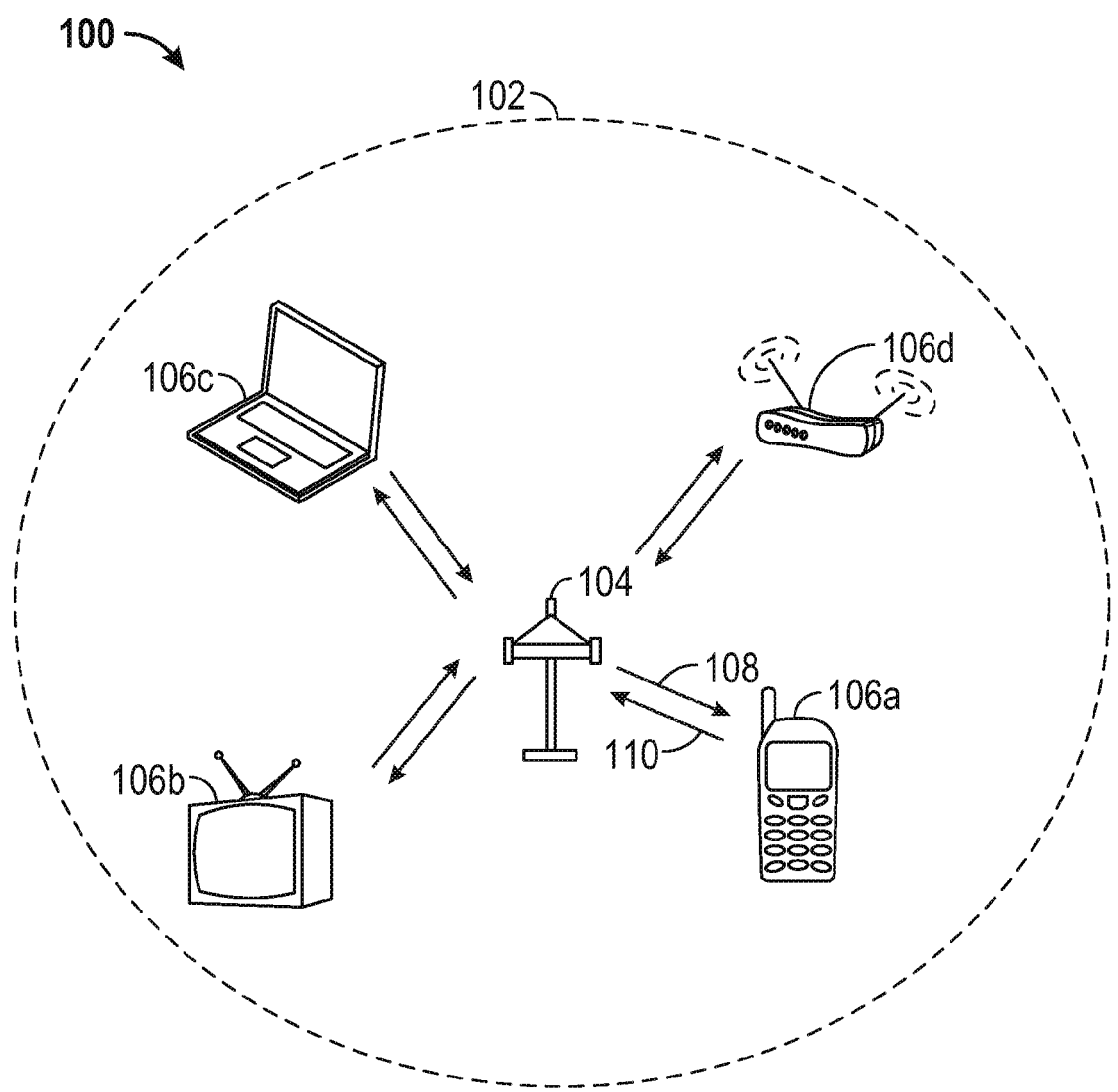
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast traffic indications.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
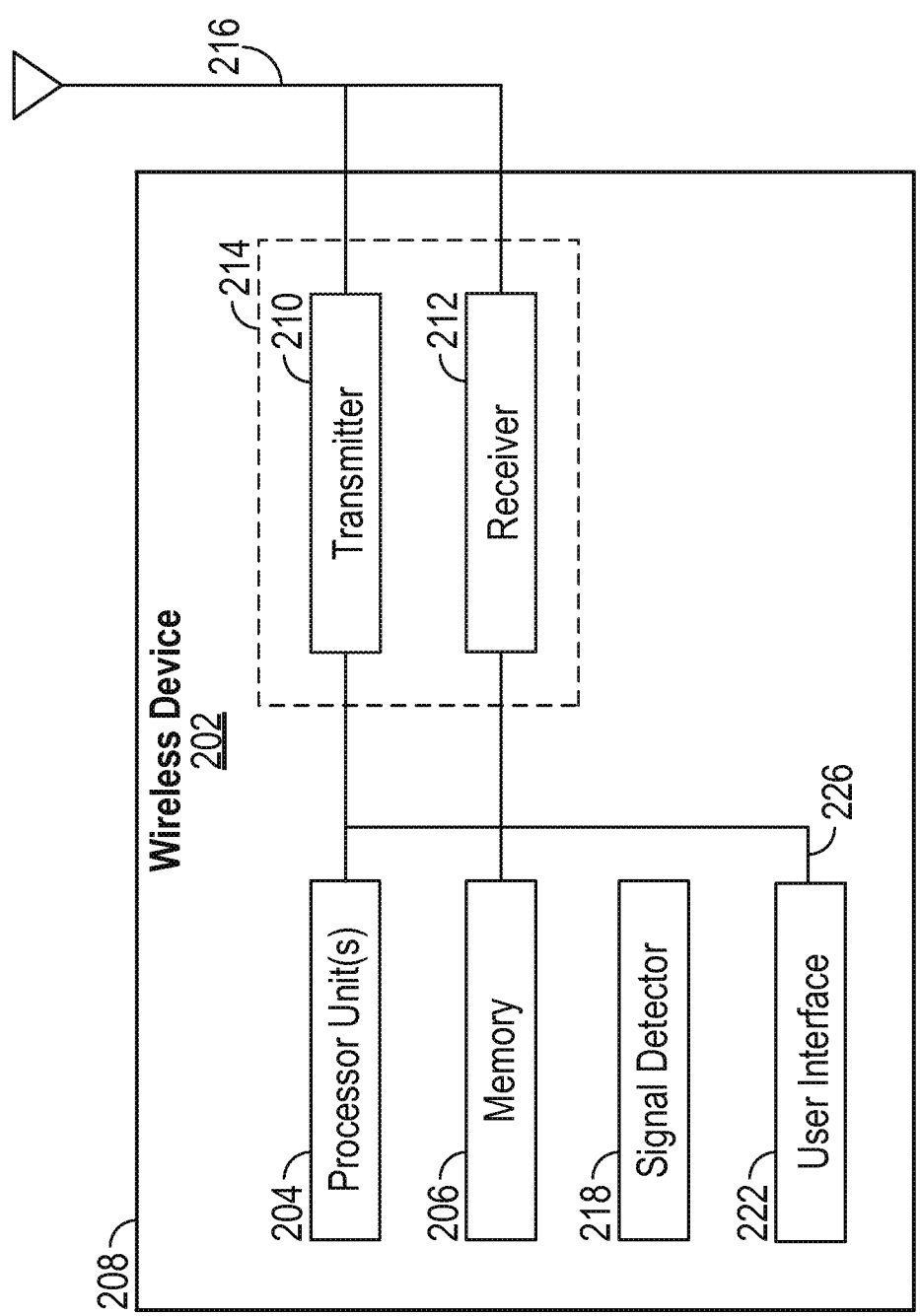
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured, for example, to wirelessly transmit messages, which may be referred to as "paging messages" that are configured to indicate to wireless devices whether or not the wireless devices have traffic pending and buffered at another device as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages.

The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including paging messages. That is, either AP 104 or STA 106 may serve as transmitter or receiver devices of paging messages. Certain aspects contemplate signal detector 218 being used by software running on memory 206 and processor 204 to detect the presence of a transmitter or receiver.

The STA 106 may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. Further, in the power save mode, the STA 106 may occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 may transmit paging messages to a plurality of STAs 106 in a power save mode in the same network as the AP 104, indicating whether or not the STAs 106 need to be in an awake state or a doze state. For example, if an STA 106 determines it is not being paged it may remain in a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure. For example, the page may indicate that the STA 106 should enter an awake state for a certain period of time because the AP 104 has data to transmit to the STA 106. The STA 106 may poll the AP 104 for data by sending the AP 104 a polling message when in the awake state for the period of time. In response to the polling message, the AP 104 may transmit the data to the STA 106.

In some aspects, paging messages may comprise a bitmap (not shown in this figure), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate whether the particular STA 106 has traffic pending and buffered at the AP 104. Accordingly, the size of the bitmap may be directly proportional to the number of STAs 106 in the wireless communications system 100. Therefore, a large number of STAs 106 in the wireless communications system 100 may result in a large bitmap. Therefore, a paging message, and in some cases the beacon or TIM frame including the paging message, may be quite large, requiring a great deal of bandwidth to transmit. Further, each STA 106 may need to listen to the entire paging message, and in some cases the beacon or TIM frame including the paging message, in order to determine whether the STA 106 may have traffic pending and buffered at the AP 104. Accordingly, certain aspects discussed herein relate to techniques for low overhead paging, whereby the STAs 106 selectively decode or listen to only certain paging messages from the AP 104.

In certain aspects related to techniques for low overhead paging, each STA 106 of the plurality of STAs 106 in the wireless communication system 100 is assigned at least one power save identifier (PS ID). In some aspects, the PS ID may be the association ID (AID) of the STA 106 (e.g., a local unique identifier may be assigned by the AP 104 at association). Each STA 106 may be assigned one or more such PS IDs. Further, a single PS ID may be assigned to one or more STAs 106. Accordingly, one or more STAs 106 may be addressed by a given PS ID. Further, a given STA 106 may be addressed by one or more PS IDs. In some aspects, the PS IDs may be assigned to STAs 106 during initialization of each STA 106 (e.g., at the time of manufacture of the STA 106, at the first run time of the STA 106, when an STA 106 join a new wireless network such as wireless communication system 100, etc.). In some aspects, the PS IDs may be assigned or additionally revised, such as through communication with other devices in the wireless communication system 100, such as the AP 104. In some aspects, the AP 104 may determine or assign PS IDs for the STAs 106 associated with the AP 104 and transmit messages indicative of the PS IDs to the STAs 106.

All of the PS IDs assigned to the STAs 106 in the wireless communication system 100 may be referred to as a set of PS IDs for the wireless communication system 100 (or alternatively for the AP 104). This set of PS IDs may be divided into a plurality of PS ID subsets, each subset including one or more of the PS IDs in the set of PS IDs. These PS ID subsets may be disjoint or overlapping, meaning that in certain aspects a plurality of the PS ID subsets may include the same PS ID, and in certain aspects one subset may include a PS ID that another subset does not include. Further, the PS ID subsets may be of the same or different sizes, meaning they contain the same or different numbers of PS IDs. Further, some PS ID subsets may include a continuous interval of PS IDs (such as a sequential series of PS IDs), while some PS ID subsets may include PS IDs that do not form a continuous interval. In one aspect, a PS ID subset may include the entire set of PS IDs. Such a subset may be referred to as a broadcast PS ID subset. In certain aspects, similar to how the STA 106 may be assigned a PS ID so that the STA 106 is aware of its PS ID as discussed above, the STA 106 may be assigned or given information to identify the PS ID subsets the STA 106 is associated with.

In some aspects, the PS ID subsets may be assigned to STAs 106 during initialization of each STA 106 (e.g., at the time of manufacture of the STA 106, at the first run time of the STA 106, when an STA 106 join a new wireless network such as wireless communication system 100, etc.). In some aspects, the PS ID subsets may be assigned or additionally revised, such as through communication with other devices in the wireless communication system 100, such as the AP 104. In some aspects, the AP 104 may determine or assign PS ID subsets for the STAs 106 associated with the AP 104 and transmit messages indicative of the PS ID subsets to the STAs 106. In some aspects, the STA 106 may send a request to the AP 104 to join particular PS ID subset group based on certain attributes of the subsets. For a non-limiting example, the STA 106 may request to join a particular PS ID subset group based on the beacon or TIM period that the STA 106 wishes to receive DL unicast traffic indications. As another non-limiting example, the STA 106 may request to join a PS ID subset group to receive traffic that matches particular filter constraints.

The AP 104 may utilize the PS ID and PS ID subsets along with paging messages as discussed below to enable the STAs 106 to selectively receive only certain paging messages at certain intervals from the AP 104.

In certain aspects, a STA may have an association identifier (AID). The AID may be distinct from the one or more PS IDs of the STA. The AID may identify the STA within an area such as a BSS, may be used as an address or a part of an address, and may be shorter than other addresses of the STA such as an IP address or a MAC address. The AID may be included in a frame to uniquely identify a sender or receiver of a message. For example, the AID may be included in a MAC header to identify a transmitting STA when the AID may be used for addressing a frame. Further, a PPDU header may include an AID or a partial AID that may be used as an early indication of an intended receiver of the frame. Advantageously, such a PPDU header may permit early termination of processing a received PPDU that is indicated to be for different receiver. In some aspects, the AID may be assigned at initialization of each STA (e.g., at manufacture or when a STA joins a wireless network).

A STA may have both an AID and one or more PS IDs as discussed in this disclosure. For instance, one PS ID may relate to a power save wake-up schedule or a schedule at which an associated TIM is transmitted by an AP. Further, if the power save wake-up schedule of the STA changes, a different PS ID may be assigned to the STA.

FIG. 3a illustrates a plurality of paging messages 302a transmitted by the AP 104 to STAs 106 in the wireless communication system 100 of FIG. 1. As shown, time increases horizontally across the page over the time axis 304a. As shown, the AP 104 may be configured to transmit a plurality of paging messages 302a. The paging messages 302a may be sent in a TIM frame, a beacon, or using some other appropriate signaling. The STAs 106 may be configured to listen to one or more of the paging messages 302a as follows.

In one aspect, each paging message 302a may include one or more identifiers (e.g., a subset identifier or group identifier) of the PS ID subset(s) for which the paging message 302a is intended. In one aspect, the identifier may be a 2 byte field capable of indexing 2^16 PS ID subsets. In another aspect, the identifier might be included in a physical layer (PHY) preamble of the paging message 302a. The STAs 106 may be assigned or given information about the identifier(s) that refer to PS ID subsets which the STAs 106 are associated with. Accordingly, STAs 106 may receive the paging message 302a. Using the identifier(s) in the paging message 302a, the STAs 106 may determine whether the paging message 302a is potentially intended for the STA 106. For example, if the paging message 302a includes an identifier for a PS ID subset the STA 106 is associated with, the STA 106 determines the paging message 302a is potentially intended for the STA 106. Further, if the paging message 302a does not include an identifier for a PS ID subset the STA 106 is associated with, the STA 106 determines the paging message 302a is not intended for the STA 106. In some aspects, the identifier(s) may be used to determine whether the STA 106 has traffic pending and buffered at the AP 104.

In another aspect, the AP 104 may be configured to transmit N paging messages 302a in sequence (where N is any positive integer), in order to page the STAs 106 at a given time. Accordingly, each paging message 302a in the sequence may be associated with a sequence number n in the N paging messages (n=1, ..., N). Each sequence number n may be associated with one or more PS ID subsets.

Accordingly, the STA 106 may determine the paging message 302*a* is potentially intended for the STA 106 based on the sequence number n of the paging message 302*a*. For example, if the sequence number n of the paging message 302*a* is associated with a PS ID subset that includes a PS ID of the STA 106, the STA 106 determines the paging message 302*a* is potentially intended for the STA 106. Further, if the sequence number n of the paging message 302*a* is not associated with a PS ID subset that includes a PS ID of the STA 106, the STA 106 determines the paging message 302*a* is not intended for the STA 106.

In certain aspects, similar to how the STA 106 may be assigned a PS ID so that the STA 106 is aware of its PS ID as discussed above, the STA 106 may be assigned or given information regarding the association between sequence numbers and PS ID subsets, e.g., the sequence number(s) n of the paging message(s) for the PS ID subset(s) to which STA 106 belongs will be transmitted and the STA 106 should listen for. Further, in certain aspects, the assignment of PS ID subsets to sequence numbers may be performed by a coordinating device of the wireless communication system 100, such as the AP 104. In certain other aspects, PS ID subsets are associated with a PS ID subset identifier. Further, the STA 106 may determine whether a PS ID subset is associated with a sequence number n based on the PS ID subset identifier. For example, if the value of the PS ID subset identifier of the PS ID subset equals mod(n, 256) the PS ID subset is associated with the sequence number n. If the value of the PS ID subset identifier of the PS ID subset does not equal mod(n, 256) the PS ID subset is not associated with the sequence number n.

Further, the TIM may carry a TIM sequence number (TSN), which may be used by STAs 106 to determine whether the TIM may be intended for a particular STA. For example, an STA may check if the sum of TSN and a TIM starting offset, modulo by the TIM interval, equals zero. The TIM interval and TIM starting offset may be different per the STAs. If the check results in zero, the STA may determine that the TIM may be intended for the STA. In some aspects, the maximum size of the TSN may be equal to or larger than the longest TIM interval. In other aspects, the TSN may be smaller, potentially indicating that some TIM size saving may be lost because STAs may typically sleep longer.

In some aspects, the TIM timing may be derived from the timing synchronization function (TSF). Accordingly, the TSN may be removed from the TIM frame. The TIM broadcast may define a series of target TIM transmission times (TTTTs). TSF 0 may be a TTTT and a target beacon transmission time (TBTT) and may have a sequence number defined as 0. Subsequent TTTTs may occur every TIM broadcast interval times the beacon interval. A subset of TTTTs or TBTTs for TIMs that may contain the PS ID of the STA may be defined. TTTT sequence number may equal TTTT divided by the product of the TIM broadcast interval and beacon interval. TBTT sequence number may equal the TBTT divided by the beacon interval. Accordingly, the TIM interval may be different per the STAs.

In another aspect, the AP 104 may be configured to transmit paging messages 302*a* at certain times (e.g., at specific time intervals, which may repeat periodically and have a periodicity). Accordingly, each paging message 302*a* may be associated with a particular time interval. Each time interval may be associated with one or more PS ID subsets.

Accordingly, the STA 106 may determine the paging message 302*a* is potentially intended for the STA 106 based on the time interval during which the paging message 302*a* is transmitted. For example, if the time interval of the paging message 302*a* is associated with a PS ID subset that includes a PS ID of the STA 106, the STA 106 determines the paging message 302*a* is potentially intended for the STA 106. Further, if the time interval of the paging message 302*a* is not associated with a PS ID subset that includes a PS ID of the STA 106, the STA 106 determines the paging message 302*a* is not intended for the STA 106.

Using the aspects discussed above, the STA 106 may determine whether a given paging message 302*a* is potentially intended for the STA 106. Once the STA 106 determines the paging message 302*a* is potentially intended for the STA 106, the STA 106 may further determine whether the paging message 302*a* is actually intended for the STA 106 and, for example, whether the STA 106 has traffic pending and buffered at the AP 104 based on the content of the paging message 302*a*.

Further, in some aspects PS IDs and PS ID subsets may be assigned and formed by the AP 104. The AP 104 may make such assignments and formations in based on information from the STA 106 about when the STA 106 requests such pages. This may lead to significant overhead at the AP 104 for performing such scheduling to accommodate requests of multiple STAs 106.

In some aspects, additionally or alternatively, the AP 104 may transmit paging messages for particular PS IDs or PS ID subsets at specific time intervals. For example, the paging message 302*a* comprising a bitmap of particular PS IDs may be transmitted at specific timer intervals. Different paging messages 302*a* may include bitmaps for different PS IDs and may be transmitted at different intervals. For example, a first paging message 302*a* may include a bitmap for a first PS ID subset (e.g., PS IDs 1-32). The first paging message may be transmitted every one TIM interval. Further, a second paging message 302*a* may include a bitmap for a second PS ID subset (e.g., PS IDs 33-64). The second paging message may be transmitted every two TIM intervals. Further, a third paging message 302*a* may include a bitmap for a third PS ID subset (e.g., PS IDs 65-98). The third paging message may be transmitted every two TIM intervals plus in the TIM interval following the every two TIM intervals. An STA 106 may then request a PS ID or inclusion in a group of PS ID subsets from the AP 104 (e.g., a PS ID in either the first, second, or third PS ID subset) that may be transmitted according to a particular schedule (e.g., TIM interval schedule). Accordingly, the STA 106 can request a particular paging message transmission schedule by in effect choosing from one of a group of interval schedules. This information can further be used as a timing source for the STA 106, and reduces overhead at the AP 104.

In certain aspects, similar to how the STA 106 may be assigned a PS ID so that the STA 106 is aware of its PS ID as discussed above, the STA 106 may be assigned or given information regarding the association between time intervals and PS ID subsets, e.g., at which timer interval the paging message(s) for the PS ID subset(s) to which STA 106 belongs will be transmitted and the STA 106 should listen for. Further, in certain aspects, the assignment of PS ID subsets to time intervals may be performed by a coordinating device of the wireless communication system 100, such as the AP 104.

FIG. 3*b* illustrates a plurality of paging messages 302*b* transmitted by the AP 104 to STAs 106 in the wireless communication system 100 of FIG. 1. As shown, time increases horizontally across the page over the time axis 304b. As shown, the AP 104 is configured to transmit a plurality of paging messages 302b. The paging messages 302b may be sent in a TIM frame. The STAs 106 may be configured to listen to one or more of the paging messages 302b as follows.

A first STA (STA1) and a second STA (STA2) may individually transmit a request message (not shown) to the AP 106. The request message may include a requested interval that the STA1 or STA2 would like to receive paging messages 302b from the AP 104, for example. The requested interval may be indicated as a multiple of a current TIM interval. The STA may request a group with a longer paging messaging period if saving power is of concern while the STA may request a shorter period if latency is of concern.

The AP 104 may receive the request message and accordingly assign STA1 or STA2 to a time grouping PS ID subset having a request interval that matches the requested interval. The time grouping PS ID subset may determine the TIM interval in which the members of the PS ID subset may receive pages. In addition, the AP 104 may determine a start time to begin transmitting paging messages, for instance, based on schedules for transmitting paging messages to other devices, such as a time when a number of STAs scheduled to receive a paging message is below a threshold or at a minimum over a time period. Additionally or alternatively, the start time may be determined based on when other devices are configured to contend to request data buffered at the AP 104 by transmitting a polling messages to the AP 104. The AP 104 may select the start time in order to optimize a time grouping of STAs to reduce uplink contention and facilitate increased compression of one or more TIMs in each paging message.

The AP 104 may respond to the request message with a response message indicating the granted TIM interval during which the STA1 or STA2 may receive paging messages from the AP 104. The TIM interval assigned to the STA may be identified as a multiple of a baseline beacon or TIM interval and based on a start time. The AP 104 may also indicate a TIM start time so that the STA1 or STA2 may be aware of the start time of the assigned interval. Further, the AP 104 may indicate a PS ID identifier, PS ID subset identifier, or group identifier so that the STA1 or STA2 may be aware of the assigned identifier. In some aspects, the AP 104 may use certification testing to ensure that STAs signal the STAs actual awake schedule, by verifying that the average number of additional TIMs between setting a TIM bit and receiving a PS-poll may be close to zero. In some aspects, when the TSN may be smaller than the longest TIM interval, the certification may be delayed additional TIMs before the PS-poll.

For example, the STA1 may request to be placed in a PS ID subset group that may receive paging messages every four TIMs. The STA2 may request to be placed in a PS ID subset that may receive paging messages every two TIMs. The AP 104 may accordingly assign STA1 and STA2 to PS ID subsets. The AP may provide a TIM start time to STA1 and STA2, so the STAs may be aware when to awake and begin listening to paging messages every scheduled TIM period. As shown in FIG. 3b, the AP may assign a start time so that both STA1 and STA2 may receive paging messages at TIM-1. Thereafter, STA1 and STA2 may awake and listen for paging messages every requested TIM interval, which may be every four TIMs for STA1 and every two TIMs for STA2. In some aspects, STA1 and STA2 may enter a sleep state during TIM periods where the STAs may choose not to listen to paging messages.

FIG. 3c illustrates a plurality of paging messages 302b transmitted by the AP 104 to STAs 106 in the wireless communication system 100 of FIG. 1. As shown, time increases horizontally across the page over the time axis 304b. In contrast to FIG. 3b, FIG. 3c illustrates a scenario where the AP 104 may have assigned STA1 and STA2 separate start TIM times. STA1 may be assigned a start time at TIM-1 while STA2 may be assigned a start time at TIM-2. Consequently, both STA1 and STA2 may transmit during the same TIM period less often than may be the case in FIG. 3b. The AP 104 may use flexibility in assigning TIM start times to optimize time grouping, reduce contention, or enable compression of TIMs, for example.

Figure 4A:
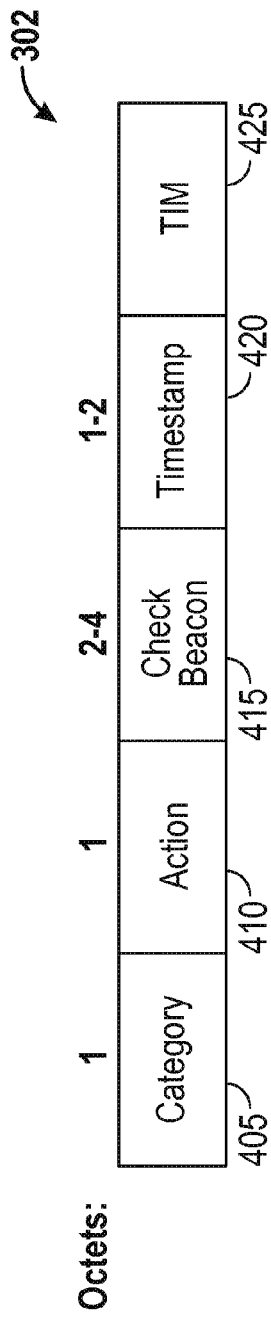
FIG. 4a illustrates an exemplary paging message of FIG. 3.

FIG. 4a illustrates an exemplary paging message frame 302, such as paging message 302a, 302b, or 302c. The paging message frame 302 may include a category field 405, action field 410, check beacon field 415, timestamp field 420, and TIM field 425. The size in octets of the category field, action field, check beacon field, and timestamp field may be 1, 1, 2-4, and 1-2, respectively. As shown, the paging message frame 302 may include a TIM field of N bits (where N is any positive integer). Each bit in the bitmap may correspond to a particular PS ID or STA 106 of the STAs 106 that are associated with the PS ID subset(s) associated with the paging message 302a. Further, the value of each bit (e.g., 0 or 1) may indicate whether the STA 106 may have traffic pending and buffered at the AP 104.

In certain aspects, similar to how the STA 106 may be assigned a PS ID so that the STA 106 is aware of its PS ID as discussed above, the STA 106 may be assigned or given information regarding which bit position(s) in the TIM is associated with the PS ID(s) of the STA 106. For example, associations between bit positions and PS IDs may be set by the AP 104 or another device in the wireless communication system 100 and communicated to the STA 106 via a message, e.g., a management message.

In other aspects, the PS ID subsets may be assigned PS ID subset identifiers that represent a starting address for each of the PS IDs in the PS ID subset (e.g., if the PS IDs in a PS ID subset are sequential (e.g., 101, 102, 103, 104, etc.) the PS ID subset identifier may be, for example, 10). Accordingly, the remaining portion of a PS ID that is not part of the PS ID identifier may be used as an index to the bitmap. Thus, a STA 106 may use associated PS ID(s) and index the bitmap to determine the intended operation state of the STA 106. For example, based on the above example, if the STA 106 is associated with PS ID 101, it may look for the value of the bit at position 1 in the bitmap to determine the intended operation state of the STA 106. In some aspects, the bit in position N of the bitmap refers to the STAs 106 with a PS ID=N+256*PS ID subset identifier.

Figure 4B:
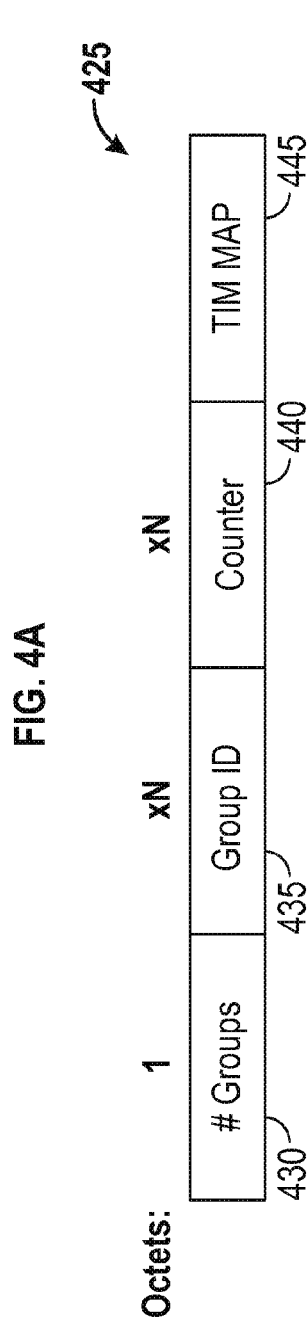

FIG. 4b illustrates another exemplary TIM field frame 425. The TIM field frame 425 may enable storage of compressed information and include a # groups field 430, group ID field 435, counter field 440, and TIM MAP field 445. The size in octets of the # groups field 430, group ID field 435, and counter field 440 may equal 1, N, and N, respectively (where N may be a variable value). This TIM frame may cover all STAs. The # groups field 430 and group ID field 435 may be understood as the # time grouping PS ID subset groups field and PS ID subset group field, respectively.

Figure 4C:
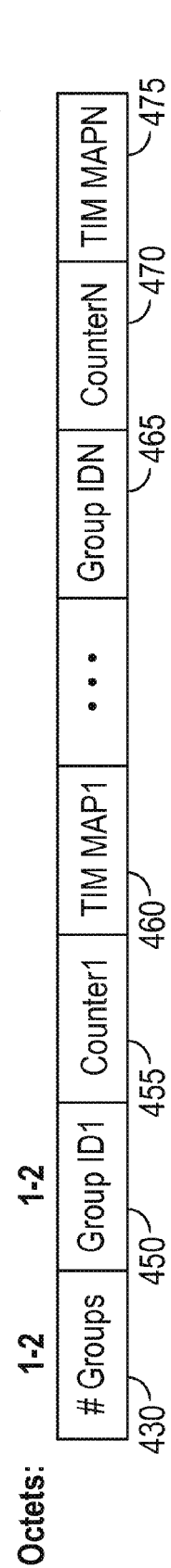

FIG. 4c illustrates another exemplary TIM field frame 425. The TIM field frame 425 may enable storage of compressed information and include a # groups field 430, group ID1 field 450, counter1 field 455, TIM MAP1 field 460, . . . , group IDN field 465, counterN field 470, and TIM MAPN field 475. The size in octets of the # groups field 430 and group ID 1 field 450 may equal 1-2 and 1-2, respectively. This TIM frame may potentially reuse the same PS ID in TIMs referred to different PS ID subsets. The # groups field 430 and group ID1/IDN fields may be understood as the # time grouping PS ID subset groups field and PS ID subset groups fields, respectively.

Accordingly, based on the above messaging schemes and techniques, low overhead paging may be achieved in the wireless communication network 100.

Figure 5:
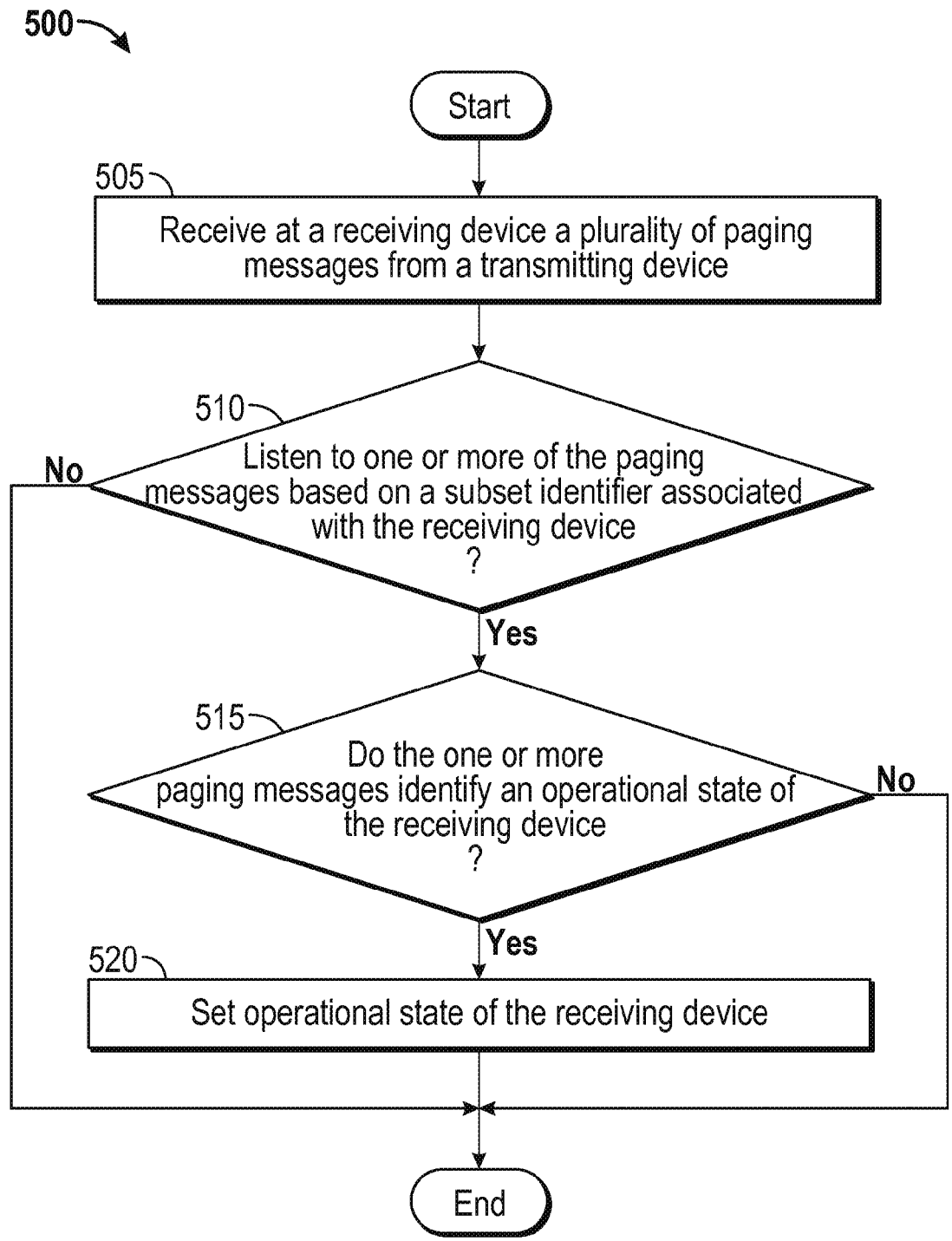
FIG. 5 is a flowchart of a process for determining an operational state of a wireless device in the wireless communication system of FIG. 1.

FIG. 5 is a flowchart of a process 500 for determining an operational state of a wireless device in the wireless communication system of FIG. 1. At a block 505, the STA 106 receives a plurality of paging messages 302 from the AP 104. At a block 510, the STA 106 determines whether it should listen to one or more paging messages 302 of the plurality of paging messages 302 based on the techniques described herein. For example, the STA 106 may make the determination based on a PS ID subset identifier included in the paging message, a sequence number n of the paging message, or a time interval the paging message was transmitted. If at the block 510, the STA 106 determines it should not listen to one or more paging messages 302, the process 500 ends. If at the block 510, the STA 106 determines it should listen to one or more paging messages 302, the process continues to block 515. At the block 515, the STA 106 determines whether the one or more paging messages identifies an operational state of the STA 106 based on the techniques described herein. For example, the STA 106 may make the determination based on a bitmap included in the paging message, an identifier of STAs 106 included in the paging message, or based on the paging message including no explicit indicator. If at the block 515, the STA 106 determines the one or more paging messages does not identify an operational state of the STA 106, the process 500 ends. If at the block 515, the STA 106 determines the one or more paging messages identify an operational state of the STA 106, the process continues to a step 520. At the step 520, the STA 106 sets its operational state based on the one or more paging messages as discussed herein.

Figure 6:
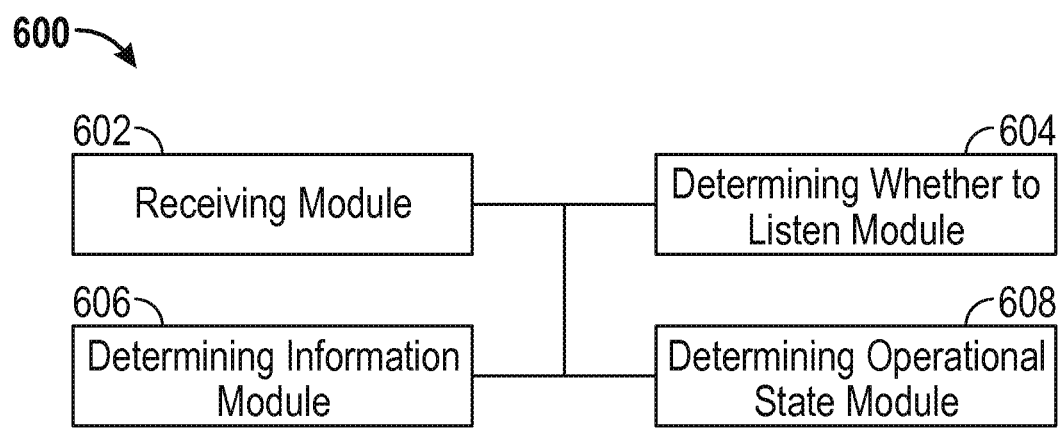
FIG. 6 is another functional block diagram of an exemplary wireless device that may be employed within the wireless communication system of FIG. 1.

FIG. 6 is another functional block diagram of an exemplary wireless device 600 that may be employed within the wireless communication system 100. The device 600 comprises a receiving module 602 for receiving a plurality of paging messages 302 from another wireless device such as the AP 104. The receiving module 602 may be configured to perform one or more of the functions discussed above with respect to the block 505 illustrated in FIG. 5. The receiving module 602 may correspond to the receiver 212. The device 600 further comprises a determining whether to listen module 604 for determining whether to listen to one or more paging messages 302 of the plurality of paging messages 302 based on the techniques described herein. The determining whether to listen module 604 may be configured to perform one or more of the functions discussed above with respect to the block 510 illustrated in FIG. 5. The determining whether to listen module 604 may correspond to the processor 204 and/or the DSP 220. The device 600 further comprises a determining information module 606 for determining whether the one or more paging messages identifies an operational state of the device 600 based on the techniques described herein. The determining information module 606 may be configured to perform one or more of the functions discussed above with respect to the block 515 illustrated in FIG. 5. The determining information module 606 may correspond to the processor 204 and/or the DSP 220. The device 600 further comprises a determining operational state module 608 for setting the operational state of the device 600. The determining operational state module 608 may be configured to perform one or more of the functions discussed above with respect to the block 520 illustrated in FIG. 5. The determining operational state module 608 may correspond to the processor 204 and/or the DSP 220.

After receiving a paging message from the AP 104 indicating the AP 104 has data for the STA 106, the STA 106 may send a polling message to the AP 104 in order to receive the data from the AP 104. In some aspects, multiple STAs 106 may be paged by the AP 104 as discussed above. Accordingly, the multiple STAs 106 may contend for one or more communication channels with the AP 104 in order to transmit the polling messages to the AP 104. If several STAs 106 attempt to send polling messages to APs such as the AP 104 at the same time, the polling messages may collide. Accordingly, in some aspects, the schedule of when the STA 106 transmits a polling message may be based on the PS ID of the STA 106 and/or the PS ID subset(s) to which the STA 106 belongs in order to reduce the likelihood of collisions as discussed below.

In one aspect, an STA 106 after receiving a paging message indicating that the AP 104 has data for the STA 106, may determine when to poll the AP 104 for data based on the PS ID of the STA 106.

For example, as discussed above with respect to FIG. 4a, the paging message 302a comprises a bitmap of N bits (where N is any positive integer). Each bit in the bitmap may correspond to a particular PS ID or STA 106 of the STAs 106 that are associated with the PS ID subset(s) associated with the paging message 302a. Further, the value of each bit (e.g., 0 or 1) may indicate the state the corresponding STA 106 with such a PS ID should be in (e.g., doze or awake). STAs 106 with associated with a bit having a value of 1 may determine the AP 104 has data to transmit to the STA 106 based on the bit value. Further, the STA 106 may determine a time to poll the AP 104 based on the position of the bit corresponding to the STA 106 (i.e., the PS ID of the STA 106) in the bitmap. For example, if the bit associated with the STA 106 is the x bit, the STA 106 may poll the AP 104 at a time based on a function of x (e.g., x*n μs after receiving the paging message 302a, where n is any positive integer). In another example, the STA 106 may determine a time to poll the AP 104 based on a hash function of the PS ID (e.g., a hash of the PS ID and the timestamp of the paging message 302a).

In another aspect, the STA 106 may determine a time to start contending for a channel to transmit a polling message to the AP 104 based on the PS ID, as opposed to determining an exact time to poll the AP 104. For example, if the bit associated with the STA 106 is the x bit, the STA 106 may contend for the channel at a time based on a function of x (e.g., x*n μs after receiving the paging message 302a, where n is any positive integer). In another example, the STA 106 may determine a time to contend for the channel based on a hash function of the PS ID (e.g., a hash of the PS ID and the timestamp of the paging message 302a).

In yet another aspect, the STA 106 may use a backoff counter to determine when to transmit a polling message to the AP 104. For example, the STA 106 may countdown a backoff counter from a starting value, and when the counter reaches 0 the STA 106 may transmit the polling message. The STA 106 may also determine if the channel is active (there is traffic on the channel) or the channel is idle (there is no traffic on the channel) while counting down. If the channel is active, the STA 106 may freeze the countdown until the channel is idle again. The STA 106 may determine the starting value of the backoff counter based on the PS ID. For example, if the bit associated with the STA 106 is the x bit, the STA 106 may set the backoff counter at a value based on a function of x (e.g., x*n μs after receiving the paging message 302a, where n is any positive integer). In another example, the STA 106 may set the backoff counter at a value based on a hash function of the PS ID (e.g., a hash of the PS ID and the timestamp of the paging message 302a).

In some aspects, the STA 106 may determine one or more parameters for the backoff procedure to transmit a polling message to the AP 104 based on the paging message and PS ID. As a non-limiting example, the STA 106 may set the contention window minimum (CWmin) to a value which may depend on the number of STAs paged in the paging message; as defined in the 802.11 backoff procedure, the STA may select a random backoff number in [0, CWmin] and use that random backoff number for contending and sending the poll message. In certain aspects, the CW may be linear with respect to the number of paged STAs.

As another non-limiting example, the STA 106 may set the CWmin to a value which depends on the number of STAs paged and/or on the PS ID in the paging message. The STA may set a new parameter contention window start (CWStart) based on the number of STAs paged in the paging message and/or on the PS ID. The STA may select a random backoff number in [CWStart, CWmin] and use that random backoff number for contending and sending the poll message.

As another non-limiting example, a STA that may not be paged but wants to access the medium to send data, may be instructed to set the parameter CWStart to be greater than the total number of STAs paged in the paging message. A STA that may be paged may be instructed to set the initial backoff counter to a value derived as discussed above. This may ensure that the initial backoff counter for STAs that may be paged may be less than the initial backoff counter for STAs that may not be paged.

In some aspects, a STA that may not be paged may be forbidden from contending for the medium for a time that may be indicated in the paging message. The time may be indicated in the message (e.g., by using the duration field in the MAC header, or may be derived from the paging message, for instance, as a function of the number of STAs that may be paged).

The use of PS IDs and PS ID subsets for transmitting and receiving paging messages as discussed above may be performed through message exchange between the STAs 106 and the AP 104. The messages may take a variety of different formats. Below are described some of the formats that different messages may take and the usage of such messages with respect to the aspects described herein.

Figure 7:
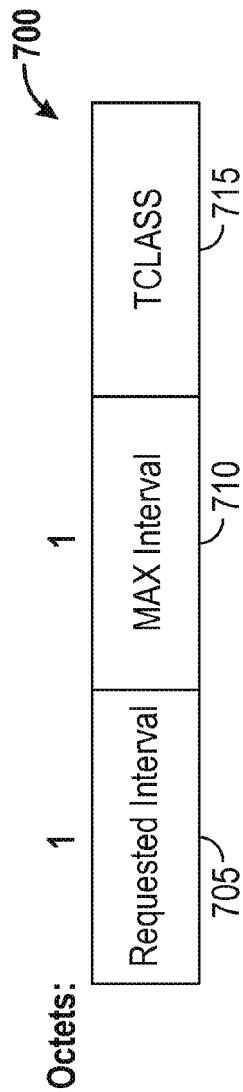
FIG. 7 illustrates a frame format for a page setup request message.

FIG. 7 illustrates a frame format for a message 700 transmitted from the STA 106 to the AP 104 to setup paging intervals and/or obtain a PS ID, PS ID subset, or PS ID subset group. The message may be referred to as a page setup request message 700. As shown in FIG. 7, the message 700 includes a requested interval field 705 comprising 1 byte, maximum (MAX) interval field 710 comprising 1 byte, and traffic class (TCLASS) field 715. The requested interval field 705 may indicate a desired multiple of the TIM interval that a STA would like to receive paging messages. The MAX interval field 710 may indicate the maximum acceptable multiple of the TIM interval that the STA would like to receive paging messages. The TCLASS field 715 may indicate a filter for traffic type so that paging messages may be referred for traffic that matches filter constraints.

Figure 8:
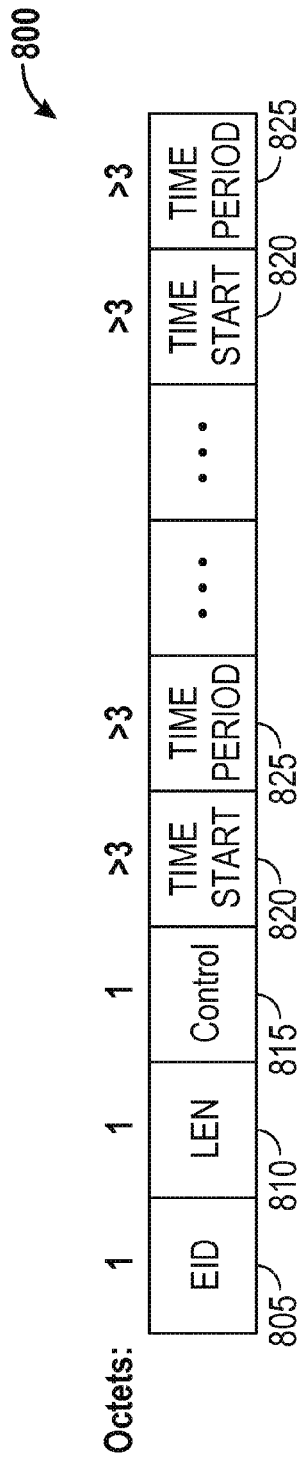
FIG. 8 illustrates another frame format for a page setup request message.

FIG. 8 illustrates a frame format for a message 800 transmitted from the STA 106 to the AP 104 to setup paging intervals and/or obtain a PS ID. The message may be referred to as a page setup request message 800. As shown in FIG. 8, the message 800 includes an equipment identifier (EID) field 805 comprising 1 byte, followed by a frame length (LEN) field 810 comprising 1 byte, followed by a control field 815 comprising 1 byte, followed by one or more time start fields 820 and time period fields 825 each comprising at least 3 bytes. The time start fields 820 indicate a time the STA 106 requests a paging interval to start (a time period where the STA 106 will wake up) and the time period fields 825 indicate a time period for the paging intervals. The times may be indicative of, for example, a number of beacon periods, a number of seconds, a number of microseconds, a multiple of a number of microseconds, or some other unit of measure. The control field 815 may indicate the manner in which the time is indicated. The response from the AP 104 to the message 800 may be a page setup response message or an ACK (e.g., an enhanced ACK with a time indication).

Figure 9:
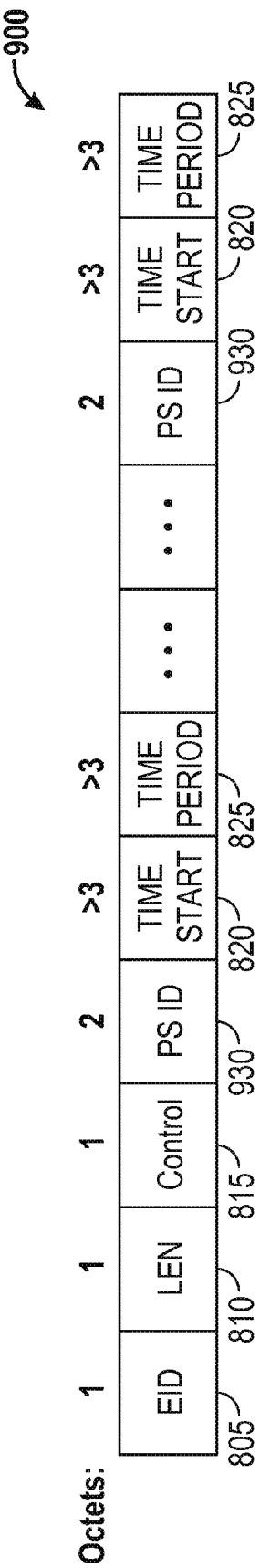
FIG. 9 illustrates yet another frame format for a page setup request message.

FIG. 9 illustrates another frame format for a message 900 transmitted from the STA 106 to the AP 104 to setup paging intervals and/or obtain a PS ID. The message 900 includes the same fields as the message 800. However, the message 900 further includes a PS ID field 930 comprising 2 bytes before each time start field 820 and time period field 825. The PS ID field 930 may indicate a specific PS ID the STA 106 requests for scheduling during the associated time start and time period.

Figure 10:
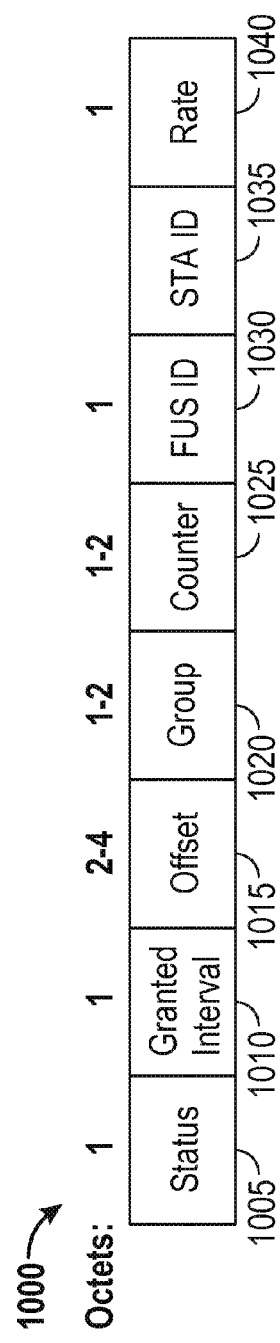
FIG. 10 illustrates a frame format for a page setup response message.

FIG. 10 illustrates a frame format for a message 1000 transmitted from the AP 104 to the STA 106. The message 1000 may be referred to as a page setup response message 1000. The message 1000 may be sent in response to receipt of the message 700 by the AP 104 from the STA 106. The message 1000 may include a status field 1005 comprising 1 byte, granted interval field 1010 comprising 1 byte, offset field 1015 comprising 2-4 bytes, group field 1020 comprising 1-2 bytes, counter field 1025 comprising 1-2 bytes, flexible unicast service (FUS) ID field 1030 comprising 1 byte, STA ID field 1035, and rate field 1040 comprising 1 byte.

The status field 1005 may indicate accepted, denied, or denied and proposed modification. The granted interval field 1010 may indicate a multiple of the TIM or DTIM. The offset field 1015 may indicate the offset, in time with respect to the beacon time, of the TIM frame that may be used to page the STA. The FUS ID field 1030 may identify the particular request for future reference in the event changes may be desired. The group field 1020 indicates a group or time grouping PS ID subset group that may be used during the paging process. The counter field 1025 may indicate how many TIM intervals may elapse until the first TIM frame related to the group or time grouping PS ID subset. The STA ID field 1035 may be used to lookup a page related to the group. The rate field 1040 may indicate whether the TIM related to the request may be sent at a low or high data bit rate, or both, and the particular rate.

Figure 11:
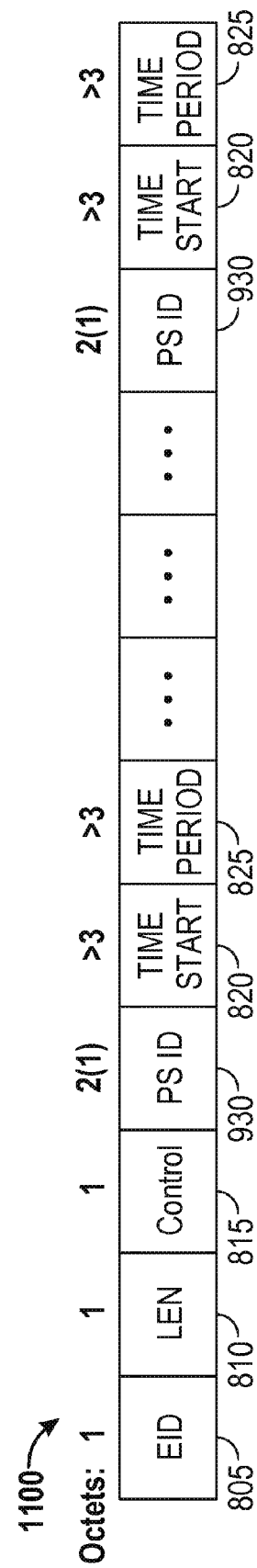
FIG. 11 illustrates another frame format for a page setup response message.

FIG. 11 illustrates a frame format for a message 1100 transmitted from the AP 104 to the STA 106. The message 1100 may be referred to as a page setup response message 1100. The message 1100 may be sent in response to receipt of the message 800 or 900 by the AP 104 from the STA 106. The message 1100 includes the same fields as the message 900. The control field 815 may be used to indicate the status (e.g., denied, accepted) of the request for a paging interval and/or PS ID from the STA 106. The time start field 820 may indicate the assigned start time for paging intervals, the time period field 835 may indicate the duration of the interval, and the PS ID field 930 may indicate the PS ID assigned for the given start time and interval. The STA 106 may respond to receipt of the message 1100 with transmission of an ACK.

Figure 12:
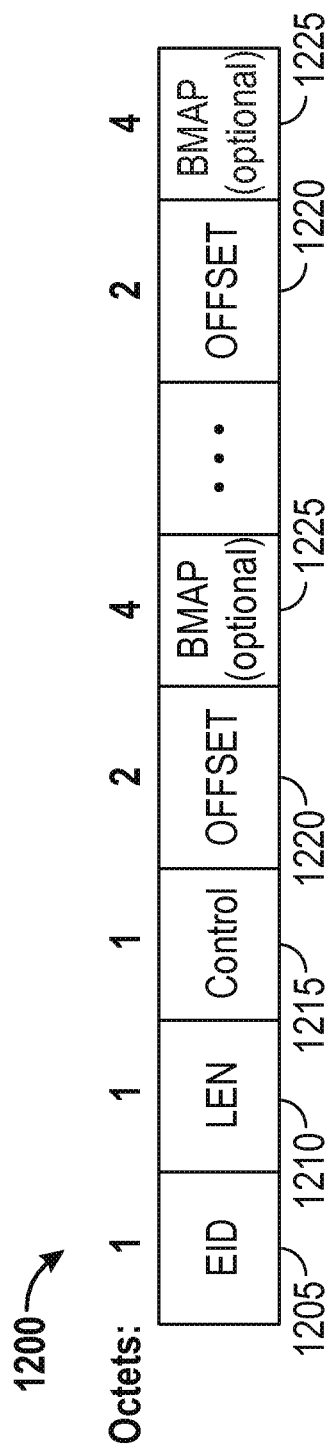
FIG. 12 illustrates another exemplary paging message.

FIG. 12 illustrates another exemplary paging message 1200. The paging message 1200 may be similar to the paging message 302*a*, 302*b*, or 302*c*. As shown, the paging message 1200 includes an EID field 1205, a LEN field 1210, a control field 1215, and one or more offset fields 1220 and optionally bitmaps (bmap) 1225. The offset field 1220 may indicate the offset from the PS ID that the STA 106 should use to index the bitmap 1225 as discussed above with respect to FIG. 4*a*. For example, an offset of 100 may indicate that the PS ID 101 is at the 1 position (101-100) of the bitmap. In another aspect, the offset field may indicate the PS ID subset that is paged.

Figure 13:
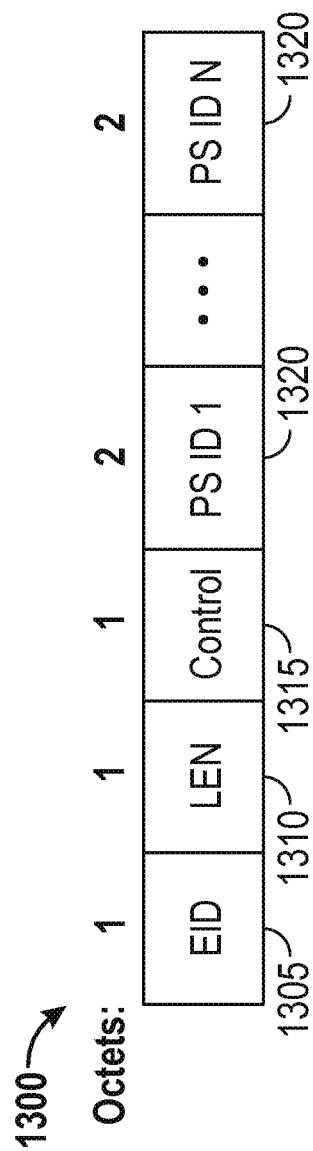
FIG. 13 illustrates another exemplary paging message.

FIG. 13 illustrates another exemplary paging message 1300. The paging message 1300 may be similar to the paging message 302*b*. As shown, the paging message 1300 includes an EID field 1305, a LEN field 1310, a control field 1315, and one or more PS ID fields 1320 comprising a PS ID list. Each PS ID field 1320 may include a particular PS ID, and the STA 106 may determine the paging message is directed to the STA 106 if its PS ID is listed in one of the PS ID fields 1320, as discussed above with respect to FIG. 4*b*.

Figure 14:
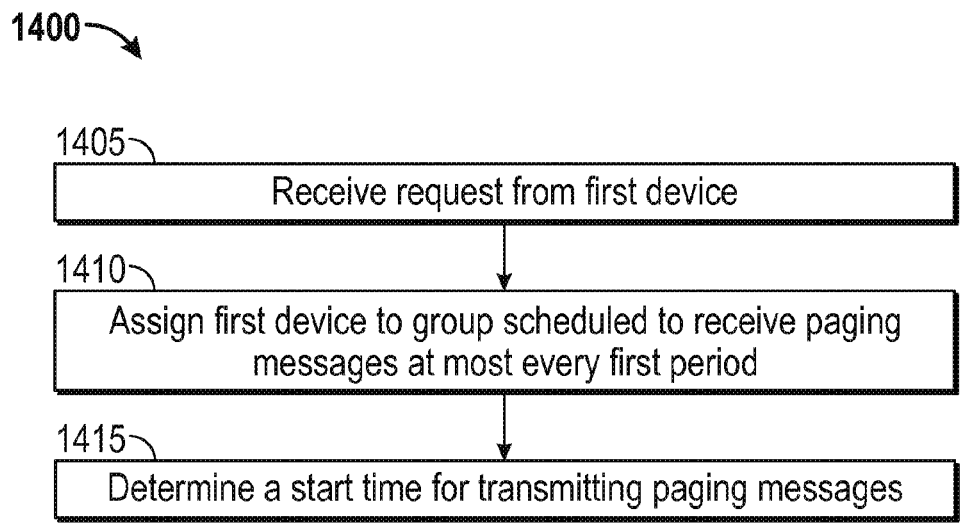
FIG. 14 is a flowchart of an exemplary process of assigning a periodic schedule for transmitting paging messages.

FIG. 14 is a flowchart of an exemplary process 1400 of assigning a periodic schedule for transmitting paging messages in accordance with aspects of the present disclosure. Although the process 1400 is described below with respect to the elements of the wireless device 202, those having ordinary skill in the art will appreciate that other components may be used to implement one or more of the steps described herein.

At block 1405, a request may be received from a first device. The request may indicate a first period of a plurality of periods corresponding to a periodicity for transmitting paging messages. The receipt of request may be performed by the receiver 212, for example.

At block 1410, the first device may be assigned to a first group scheduled to receive paging messages at most every first period based on the request. The assignment may be performed by the processor 204, for example.

At block 1415, a start time for transmitting paging messages to the first device may be determined. The start time may be determined, for instance, based on schedules for transmitting paging messages to other devices. The determination may be performed by the processor 204, for example.

Figure 15:
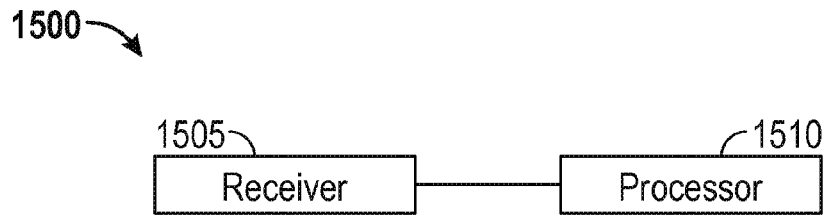
FIG. 15 is a functional block diagram of an exemplary wireless device that may be employed within the wireless communication system of FIG. 1.

FIG. 15 is a functional block diagram of an exemplary wireless device 1500 that may be employed within the wireless communication system of FIG. 1. The wireless device 1500 may include a receiver 1505 configured to receive a request from a first device. The receiver 1505 may be configured to perform one or more functions discussed above with respect to block 1405 of FIG. 14. The receiver 1505 may correspond to receiver 212. The wireless device 1500 may further include a processor 1510 configured to assign the first device to a first group and determine a start time for transmitting paging messages. The processor 1510 may be configured to perform one or more functions discussed above with respect to blocks 1410 and 1415 of FIG. 14. The processor 1510 may correspond to processor 204.

Moreover, in one aspect, means for receiving a request from a first device may comprise the receiver 1505. In another aspect, means for assigning the first device to a group and determining the start time for transmitting paging messages to the first device may comprise the processor 1510.

Figure 16:
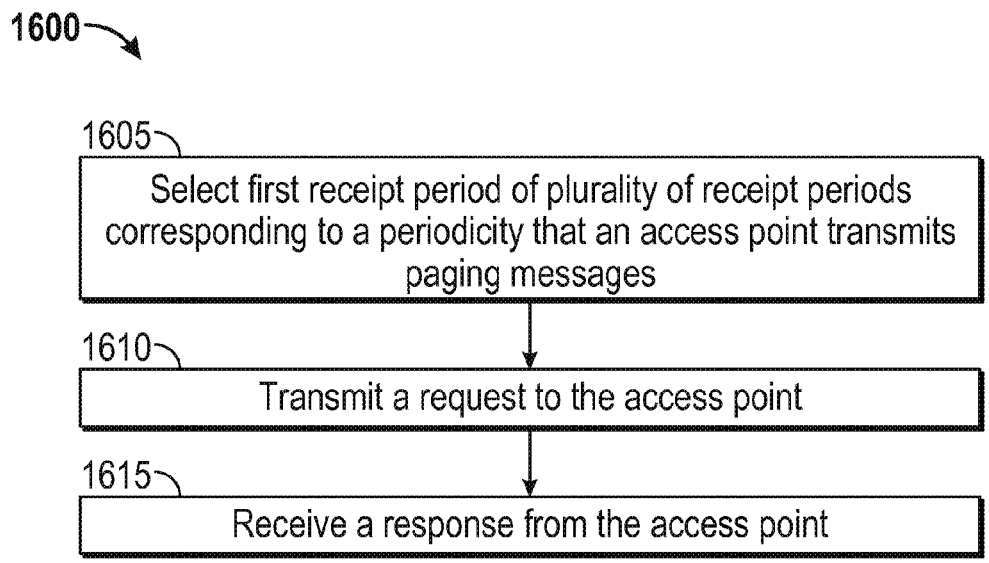
FIG. 16 is a flowchart of an exemplary process of requesting a periodic schedule for receiving paging messages.

FIG. 16 is a flowchart of an exemplary process 1600 of requesting a periodic schedule for receiving paging messages in accordance with aspects of the present disclosure. Although the process 1600 is described below with respect to the elements of the wireless device 202, those having ordinary skill in the art will appreciate that other components may be used to implement one or more of the steps described herein.

At block 1605, a first period of a plurality of periods may be selected based on corresponding to a periodicity that an access point transmits paging messages. The selection may be performed by the processor 204, for example.

At block 1610, a request may be transmitted to the access point. The request may indicate selection of first period. The transmission may be performed by the transmitter 210, for example.

At block 1615, a response may be received from the access point. The response may indicate assignment of a granted periodicity for receiving paging messages and a start time for receiving paging messages. The start time may be determined by the access point based on schedules for transmitting paging messages to other devices. The transmission may be performed by the transmitter 210, for example.

Figure 17:
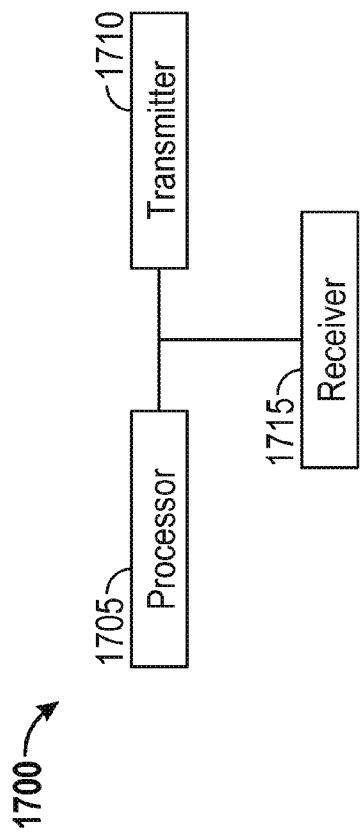
FIG. 17 is a functional block diagram of an exemplary wireless device that may be employed within the wireless communication system of FIG. 1.

FIG. 17 is a functional block diagram of an exemplary wireless device 1700 that may be employed within the wireless communication system of FIG. 1. The wireless device 1700 may include a processor 1705 configured to select a first period of a plurality of periods corresponding to a periodicity that an access point transmits paging messages. The processor 1705 may be configured to perform one or more functions discussed above with respect to block 1605 of FIG. 16. The processor 1705 may correspond to processor 204. The wireless device 1700 may further include a transmitter 1710 configured to transmit the request to the transmitting device indicating selection of the first period. The transmitter 1710 may be configured to perform one or more functions discussed above with respect to block 1610 of FIG. 16. The transmitter 1710 may correspond to transmitter 210. The wireless device 1700 may further include a receiver 1715 configured to receive the response from the access point. The receiver 1715 may be configured to perform one or more functions discussed above with respect to block 1615 of FIG. 16. The receiver 1715 may correspond to receiver 212.

Moreover, in one aspect, means for selecting the first period may comprise the processor 1705. In another aspect, means for transmitting the request to the access device may comprise the transmitter 1710. In yet another aspect, means for receiving the response from the access point may comprise the receiver 1715.

Figure 18:
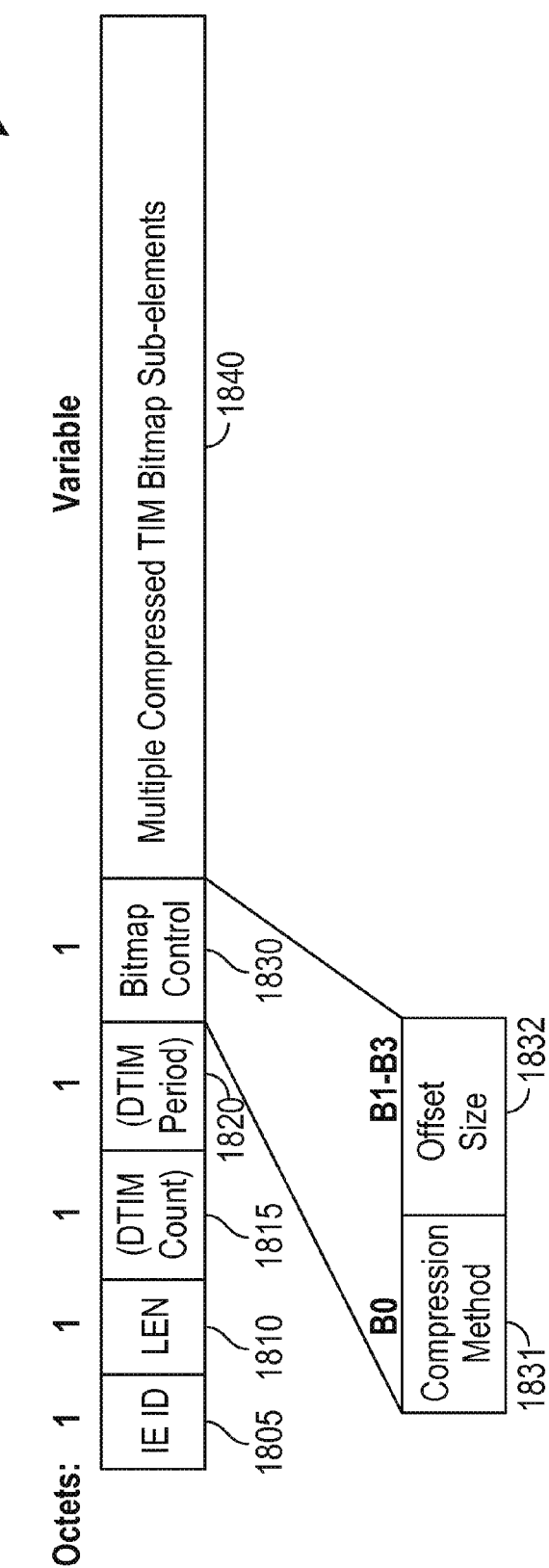
FIG. 18 illustrates an exemplary paging message.

FIG. 18 illustrates an exemplary frame format for a paging message 1800 transmitted from the AP 104 to the STA 106. The paging message 1800 may be similar to the paging message 302*a*, 302*b*, or 302*c*. As shown, the paging message 1800 includes an Information Element identification (IE ID) field 1805, a LEN field 1810, a Delivery Traffic Indication Message (DTIM) count field 1815 and a DTIM period field 1820. Each of these fields may have a size of 1 octet (byte).

Further, as shown, the paging message 1800 includes a bitmap control field 1830 and a compressed TIM bitmap field 1840 comprising multiple compressed TIM bitmap sub-elements. The size of field 1840 may be variable and may depend on the method of compression that is used, as discussed below. The bitmap control field 1830 may have a size of 1 octet (byte), and further comprise field 1831 and field 1832. Field 1831 is used to indicate the method of compression used for compressing the TIM bitmap sub-elements included in field 1840. The method of compression may be the same for all the compressed TIM bitmap sub-elements included in field 1840. The size of field 1831 may depend on the number of possible method of compressions used for compressing the TIM bitmap sub-elements. By way of example, and not limitation, if there are only two possible methods of compressions, a single bit B0 may be sufficient to indicate which method has been used for compressing the TIM bitmap sub-elements included in field 1840. Field 1840 includes a sequence of compressed TIM bitmap sub-elements that have all been compressed by the method indicated in field 1831.

By way of example, and not limitation, one compression method may be a compression method that operates at a block level, and can be referred to as hierarchical compression. Another method of compression may instead be based on a basic bitmap sub-element that may include, for example, three fields such as an offset field, a bitmap length field and a bitmap field. This method can be referred to as offset compression. More details of such a method are given below.

Field 1832 may be used to indicate the length of the offset field when the offset compression method is employed for compressing the TIM bitmap sub-elements included in field 1840. However, it is to be understood that field 1832 is not to be limited to a use in conjunction with the offset compression method as described above, but it may also be used for other compression methods that require, for example, an indication of a length of an offset field. The length of the offset field as indicated by field 1832 may apply to all the sub-elements of included in field 1840. Further, the offset field may indicate an identifier of a first STA indicated by the sub-element. Such a variable length may be useful when the maximum offset to be represented has a small value, so that it can be represented with fewer bits, and hence result in a shorter message. By way of example, and not limitation, the size of field 1832 may depend on the length of the offset, for example up to 3 bits as shown in FIG. 18. In certain aspects, field 1832 may be omitted.

In another aspect, the length of the offset field as indicated by field 1832 may apply to all sub-elements included in field 1840, except for the first one. In this aspect, the offset in the first sub-element may have a fixed length (e.g., 13 bits) not depending on the indication 1832. The offset in the first sub-element may indicate the identifier of a paged STA, while the offset in the sub-elements other than the first one may indicate a value equal to the identifier of the paged STA less the offset value indicated by the first element.

In some aspects, the DTIM period field 1820 or the bitmap control field 1830 may include a sub-element length field (not shown). The sub-element length field may specify the bitmap length for some or all compressed TIM bitmap sub-elements included in field 1840. In one aspect, the sub-element length field may specify the individual bitmap length for each of the some or all compressed TIM bitmap sub-elements.

Figure 19:
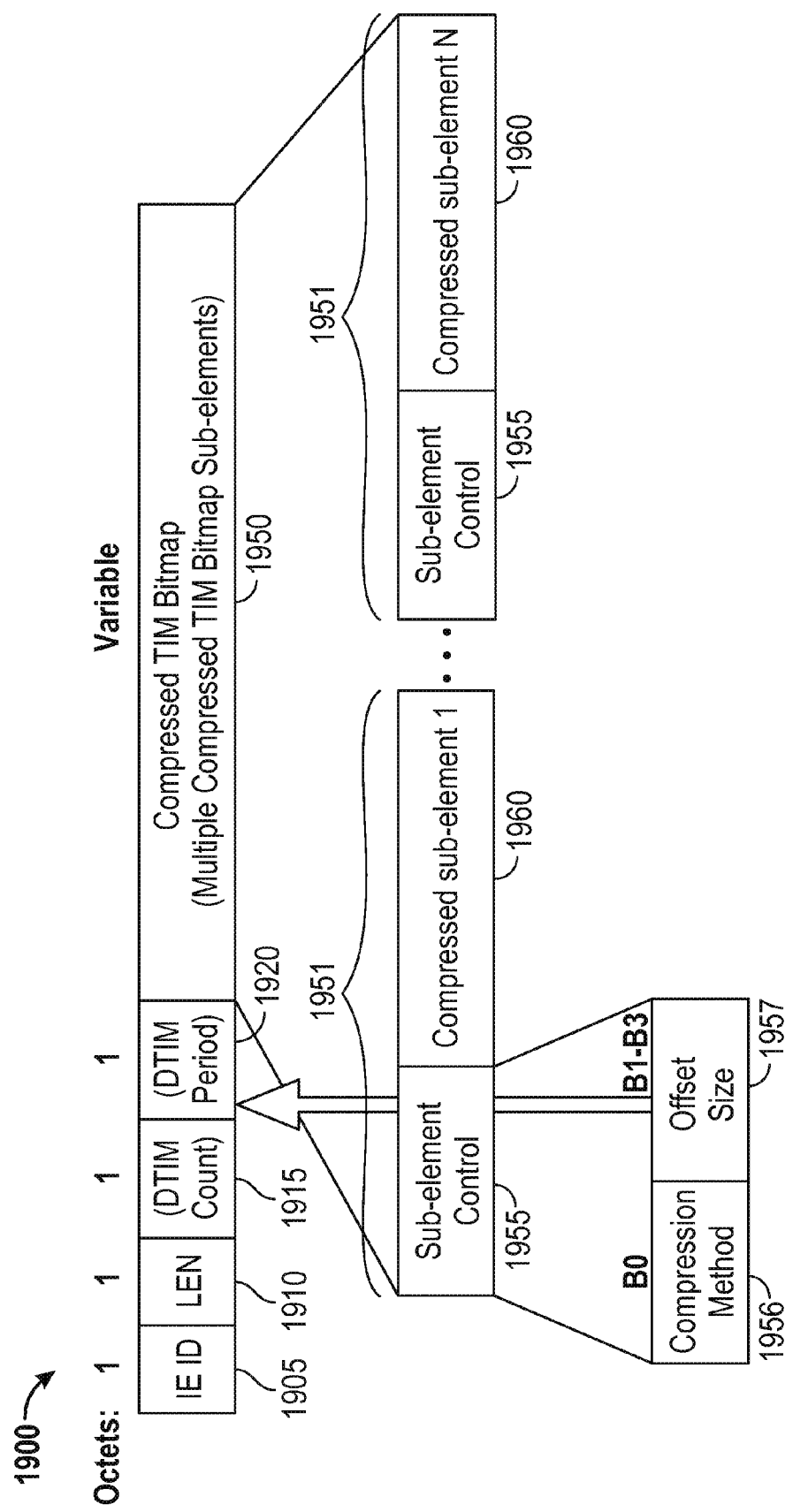
FIG. 19 illustrates another exemplary paging message.

FIG. 19 illustrates an exemplary frame format for a paging message 1900 transmitted from the AP 104 to the STA 106. The paging message 1900 may be similar to the paging message 302*a*, 302*b*, or 302*c*. As shown, the paging message 1900 includes an Information Element identification (IE ID) field 1905, a LEN field 1910, a Delivery Traffic Indication Message (DTIM) count field 1915 and a DTIM period field 1920. Each of these fields may have a size of 1 octet (byte).

Further, as shown, the paging message 1900 includes a compressed TIM bitmap field 1950 comprising multiple compressed TIM bitmap sub-elements. The size of field 1950 may be variable and may depend on the method of compression that is used, as discussed below.

Compressed TIM bitmap field 1950 may comprise N pairs of fields 1951, each pair 1951 formed of sub-element control field 1955 and compressed sub-element field 1960, wherein N is the total number of compressed TIM bitmap sub-elements included in compressed TIM bitmap field 1950. Each sub-element control field 1955 in a pair 1951 may comprise field 1956 and field 1957. Field 1956 of pair 1951 is used to indicate the method of compression used for compressing the TIM bitmap sub-element included in field 1960 of the same pair 1951. Thus, a TIM bitmap sub-element may be compressed with a method of compression that may be different from that used for compressing another TIM bitmap sub-element. In other words, the method of compression is applied per TIM bitmap sub-element. Nevertheless, in some scenarios it may occur that the same method of compression is used for all the TIM bitmap sub-elements. The exemplary frame format 1900 would equally apply to such scenarios. The size of field 1956 may depend on the number of possible method of compressions used for compressing the TIM bitmap sub-element 1960, in a similar way as described above in relation to field 1831.

Field 1957 of pair 1951 may be used to indicate the length of the offset field when the offset compression method is employed for compressing the TIM bitmap sub-elements included in field 1960 of pair 1951. However, it is to be understood that field 1957 is not to be limited to a use in conjunction with the offset compression method as described above, but it may also be used for other compression methods that require, for example, an indication of a length of an offset field. By way of example, and not limitation, the size of field 1957 may depend on the length of the offset, for example up to 3 bits as shown in FIG. 19. In certain aspects, field 1957 may be omitted.

In one aspect, field 1957 may be a field common to all the TIM bitmap sub-elements. Accordingly, field 1957 may be included directly and only once into the paging message 1900, rather than being included for each pair 1951. In other words, the length of the offset field is indicated per TIM frame rather than per TIM bitmap sub-element. According to this aspect, all TIM bitmap sub-elements 1960 that are compressed using the offset compression method (or a compression method that may require an indication of an offset length) will use the same length of the offset field as indicated in the common field 1957. Moreover, according to this aspect, the sub-element control field 1955 for each pair 1951 will comprise only field 1956. One of the advantages of this aspect may be, for example, to further reduce the size of the compressed TIM bitmap field 1950. In certain aspects, field 1957 may be omitted.

A TIM bitmap sub-element may correspond to a TIM bitmap sub-set of the complete TIM bitmap. A compressed TIM bitmap sub-element is a compressed version of the TIM bitmap sub-element. Some of the possible methods of compression are illustrated below. By way of example, and not limitation, the complete TIM bitmap may comprise clusters of ones. Based on these clusters, the complete TIM bitmap may be split into different bitmap sub-sets which are then compressed independently from each other. In one aspect, the TIM bitmap sub-element may include only a single bit corresponding to a single STA 106. In certain aspects, these TIM bitmap sub-elements may correspond to groups of STAs as described above.

In some aspects, the DTIM period field 1920 or the sub-element control field 1955 may include a sub-element length field (not shown). The sub-element length field may specify the bitmap length for some or all compressed TIM bitmap sub-elements included in one or more fields 1960. In one aspect, the sub-element length field may specify the individual bitmap length for each of the some or all compressed TIM bitmap sub-elements.

Figure 20:
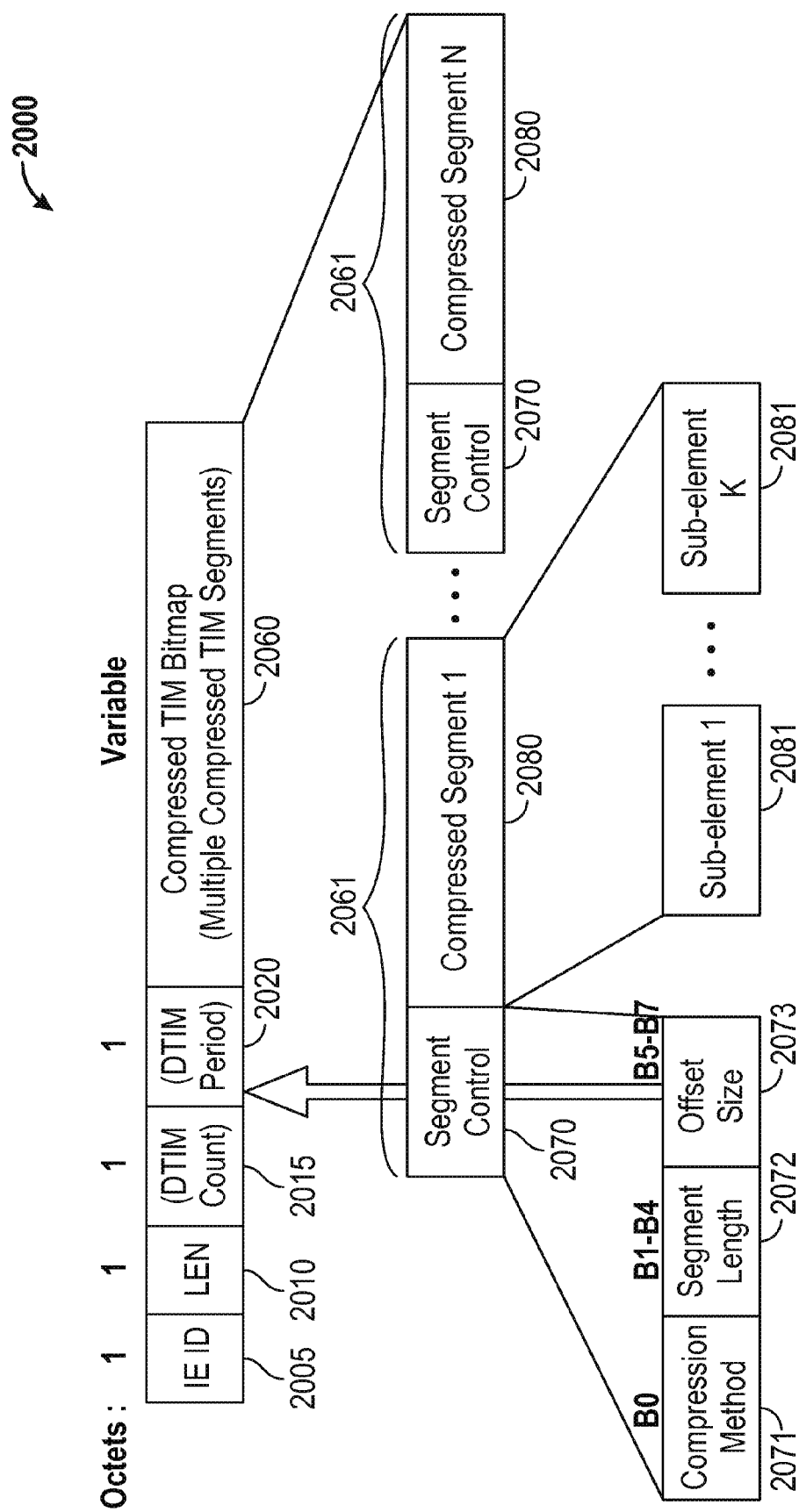
FIG. 20 illustrates another exemplary paging message.

FIG. 20 illustrates an exemplary frame format for a paging message 2000 transmitted from the AP 104 to the STA 106. The paging message 2000 may be similar to the paging message 302a, 302b, or 302c. As shown, the paging message 2000 includes an Information Element identification (IE ID) field 2005, a LEN field 2010, a Delivery Traffic Indication Message (DTIM) count field 2015 and a DTIM period field 2020. Each of these fields may have a size of 1 octet (byte).

Further, as shown, the paging message 2000 includes a compressed TIM bitmap field 2060 comprising multiple compressed TIM bitmap segments. The size of field 2060 may be variable and may depend on the method of compression that is used, as discussed below.

Compressed TIM bitmap field 2060 may comprise N pairs of fields 2061, each pair 2061 formed of segment control field 2070 and compressed segment field 2080, wherein N is the total number of compressed TIM bitmap segments included in compressed TIM bitmap field 2060.

Each compressed segment field 2080 in a pair 2061 comprises K compressed TIM bitmap sub-elements 2081. All the TIM bitmap sub-elements 2081 included in a compressed segment field 2080 may be compressed using the same method of compression. By way of example, but not limitation, the use of compressed segment fields and the information associated with the fields, as described, is useful when a TIM bitmap sub-element includes only a single bit corresponding to a single STA 106.

Each segment control field 2070 in a pair 2061 may comprise field 2071, field 2072 and field 2073. Field 2071 of pair 2061 is used to indicate the method of compression used for compressing the TIM bitmap segment included in field 2080 of the same pair 2061. As described, all the TIM bitmap sub-elements 2081 included in a compressed segment field 2080 may be compressed using the same method of compression. Thus, a TIM bitmap segment may be compressed with a method of compression that may be different from that used for compressing another TIM bitmap segment. In other words, the method of compression is applied per TIM bitmap segment. Nevertheless, in some scenarios, it may occur that the same method of compression is used for all the TIM bitmap segments. The exemplary frame format 2000 would equally apply to such scenarios. The size of field 2071 may depend on the number of possible method of compressions used for compressing the TIM bitmap segment 2080, in a similar way as described above in relation to field 1831.

Field 2072 of pair 2061 is used to indicate the number of TIM sub-elements 2081 included in TIM bitmap segment 2080 of pair 2061. In a non-limiting aspect, the size of field 2072 is 4 bits, thus allowing up to 16 TIM bitmap sub-elements per segment. Field 2073 of pair 2061 may be used to indicate the length of the offset field when the offset compression method is employed for compressing the TIM bitmap sub-elements 2081 included in compressed segment field 2080 of pair 2061. However, it is to be understood that field 2073 is not to be limited to a use in conjunction with the offset compression method as described above, but it may also be used for other compression methods that require, for example, an indication of a length of an offset field. By way of example, and not limitation, the size of field 2073 may depend on the length of the offset, for example up to 3 bits as shown in FIG. 20. In certain aspects, field 2073 may be omitted.

In one aspect, field 2073 may be a field common to all the TIM bitmap segments. Accordingly, field 2073 may be included directly and only once into the paging message 2000, rather than being included for each pair 2061. In other words, the length of the offset field is indicated per TIM frame rather than per TIM bitmap segment. According to this aspect, all TIM bitmap sub-elements 2081 that are compressed using the offset compression method (or a compression method that requires indication of an offset length) will use the same length of the offset field as indicated in the common field 2073. Moreover, according to this aspect, the segment control field 2070 for each pair 2061 will comprise only field 2071 and field 2072. One of the advantages of this aspect may be, for example, to further reducing the size of the compressed TIM bitmap field 2060. In a non-limiting aspect, the bits not used by field 2073 in each pair 2061 can be used field 2072. Thus, the size of field 2072 may be 7 bits, thus allowing up to 128 TIM bitmap sub-elements per segment. In certain aspects, field 2073 may be omitted.

In some aspects, the DTIM period field 2020 or the segment control field 2070 may include a sub-element length field (not shown) or segment length field (not shown). The sub-element length field may specify the bitmap length for one or more TIM bitmap sub-elements included in one or more fields 2080. In one aspect, the sub-element length field may specify the individual bitmap length for each of the one or more TIM bitmap sub-elements. Further, the segment length field may specify the bitmap length for one or more pairs 2061.

Figure 21:
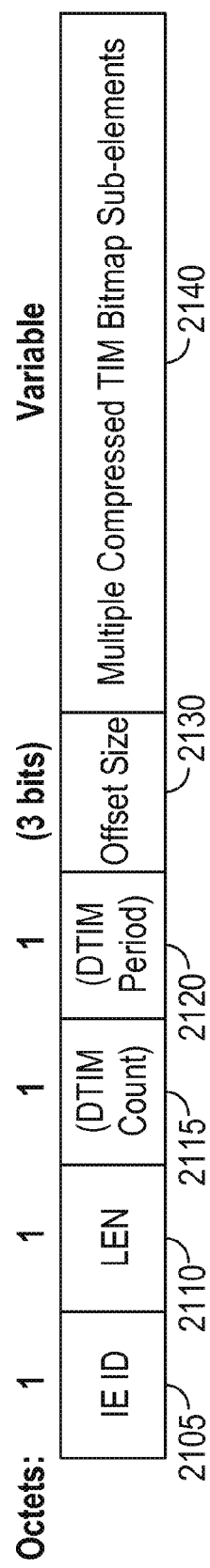
FIG. 21 illustrates another exemplary paging message.

FIG. 21 illustrates an exemplary frame format for a paging message 2100 transmitted from the AP 104 to the STA 106. The paging message 2100 may be similar to the paging message 302a, 302b, or 302c. As shown, the paging message 2100 includes an Information Element identification (IE ID) field 2105, a LEN field 2110, a Delivery Traffic Indication Message (DTIM) count field 2115 and a DTIM period field 2120. Each of these fields may have a size of 1 octet (byte).

Further, as shown, the paging message 2100 includes a compressed TIM bitmap field 2140 comprising multiple compressed TIM bitmap sub-elements. The size of field 2140 may be variable and may depend on the method of compression that is used. Further, as shown, the paging message 2100 may include a field 2130 that is used to indicate the length of the offset field when the offset compression method (or a compression method that requires indication of an offset length) is employed for compressing the TIM bitmap sub-elements. By way of example, and not limitation, the size of field 2130 may depend on the length of the offset, for example up to 3 bits as shown in FIG. 21.

In some aspects, the DTIM period field 2120 may include a sub-element length field (not shown). The sub-element length field may specify the bitmap length for some or all compressed TIM bitmap sub-elements included in field 2140. In one aspect, the sub-element length field may specify the individual bitmap length for each of the some or all compressed TIM bitmap sub-elements.

Figure 22:
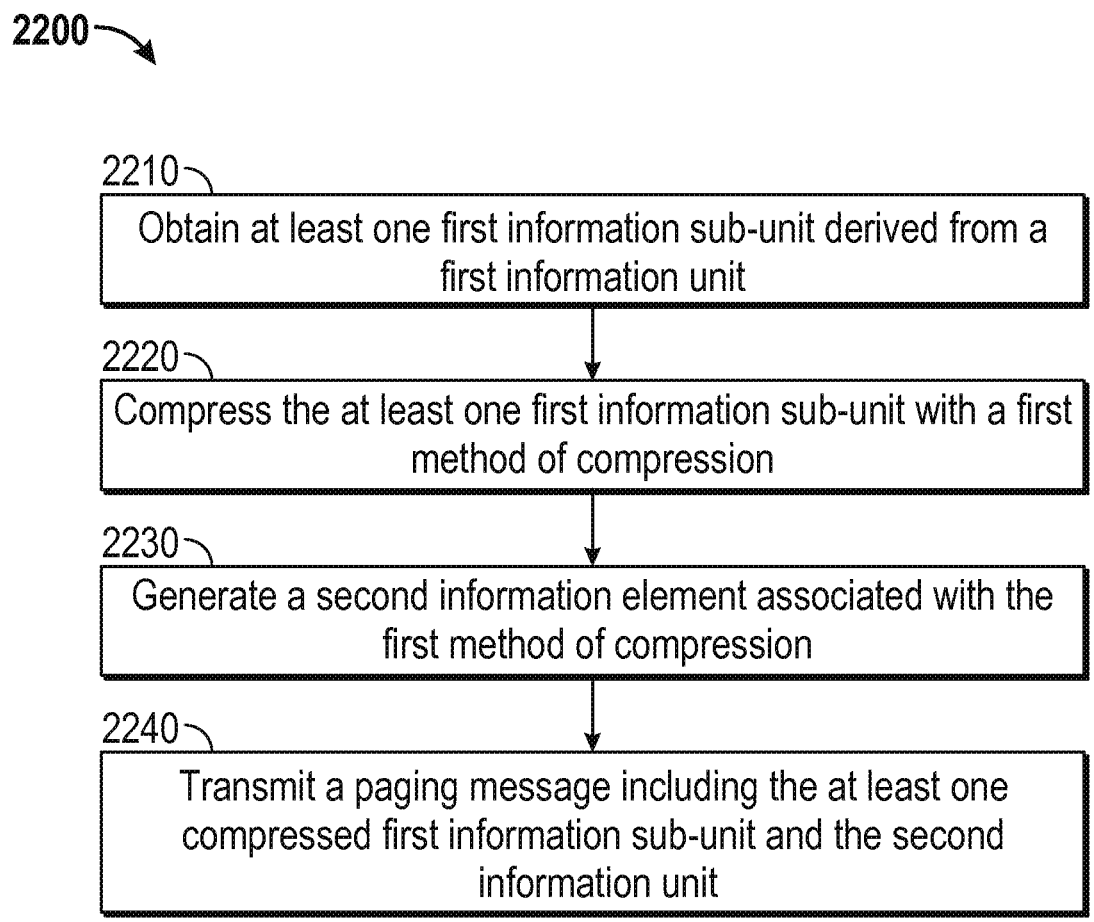
FIG. 22 is a flowchart of an exemplary process for wireless communications.

FIG. 22 is a flowchart of an exemplary process 2200 for wireless communications. At block 2210, the AP 104 obtains at least one first information sub-unit derived from a first information unit. In some aspects, the AP 104 may derive the at least one first information sub-unit from the first information unit. The first information unit is associated with a paging message. The at least one information sub-unit is arranged for processing by a first method of compression in order to obtain at least one first compressed information sub-unit. At block 2220, the AP 104 compresses the at least one first information sub-unit with a first method of compression associated with the at least one first information sub-unit. At block 2230, the AP 104 generates a second information unit associated with the first method of compression. At block 2240, the AP 104 transmit a paging message including the at least one first compressed information sub-unit and the second information unit. It is to be understood that any of the above blocks may be performed by an apparatus associated with AP 104. By way of example, but not limitation, the at least one first compressed information unit may correspond to compressed elements 1840, 1960, 2080 and 2140 as described above, whereas the second information unit may correspond to control elements 1830, 1955, 2070 and 2130, respectively.

Figure 23:
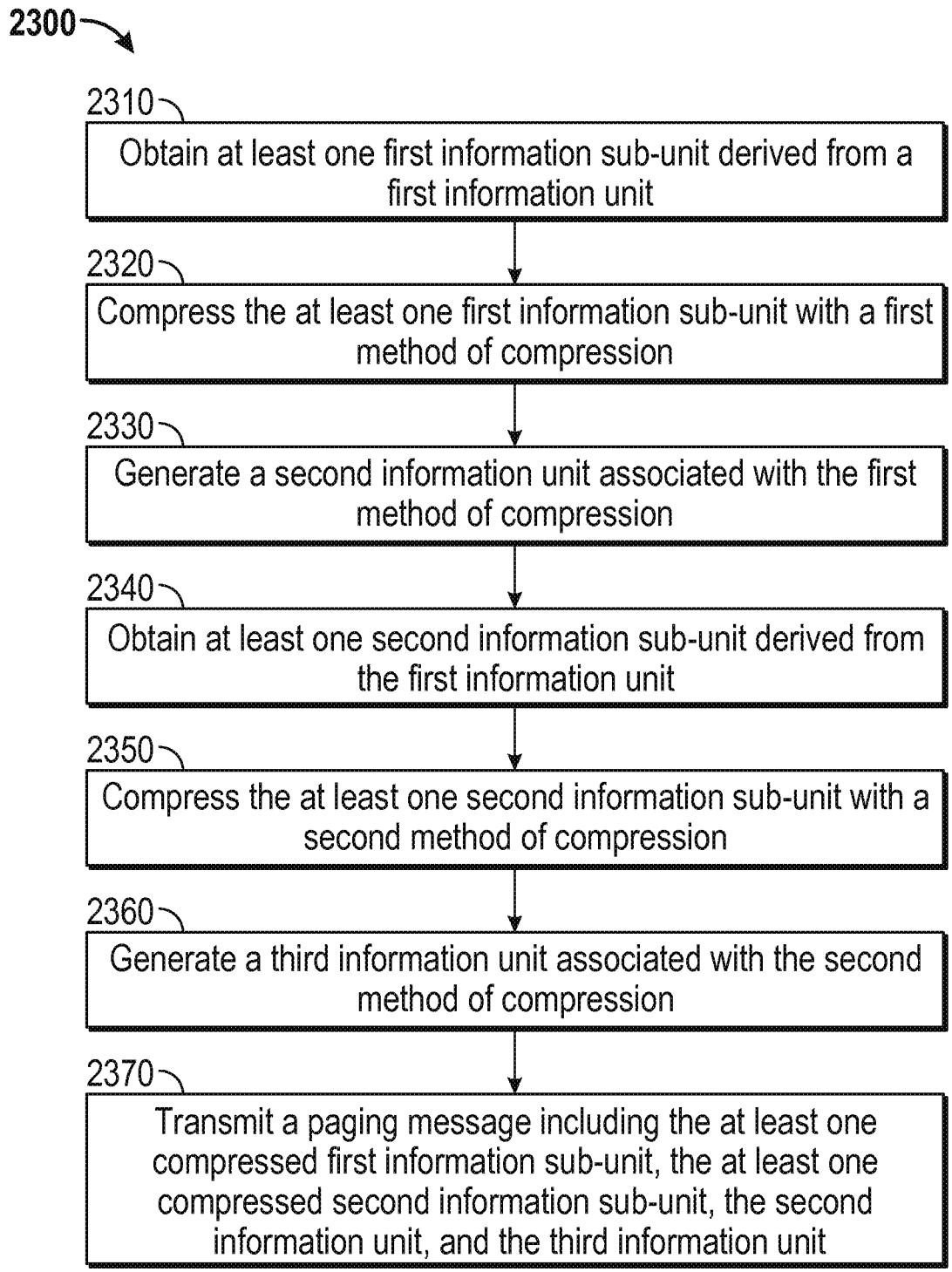
FIG. 23 is a flowchart of another exemplary process for wireless communications.

FIG. 23 is a flowchart of an exemplary process 2300 for wireless communications. Block 2310 corresponds to block 2210 as described above. Similarly, block 2320 and block 2330 correspond to block 2220 and block 2230, respectively, as described above. At block 2340, the AP 104 obtains at least one second information sub-unit derived from the first information unit. In some aspects, the AP 104 derives the at least one second information sub-unit from the first information unit. The first information unit is associated with the paging message. The at least one information sub-unit is arranged for processing by a second method of compression in order to obtain at least one first compressed information sub-unit. At block 2350, the AP 104 compresses the at least one second information sub-unit with a second method of compression associated with the at least one second information sub-unit. At block 2360, the AP 104 generates a third information unit associated with the second method of compression. At block 2370, the AP 104 transmit a paging message including the at least one first compressed information sub-unit, the at least one second compressed information sub-unit, the second information unit and the third information unit. It is to be understood that any of the above blocks may be performed by an apparatus associated with AP 104. By way of example, but not limitation, the at least one first compressed information unit may correspond to compressed elements 1960 and 2080 as described above, whereas the third information unit may correspond to control elements 1955 and 2070, respectively.

As intended herein, the word "information unit" encompasses a set of data associated with information (e.g., bits, bytes, or any other suitable data). This set of data associated with information may comprise one or more sub-sets of data associated with information, herein referred to as "information sub-units". The cardinality of an information unit is defined as the number of sub-sets included in the set.

In some aspects, the bitmap may be compressed in order to obtain a compressed paging message. FIG. 24a illustrates an exemplary paging message 2400 with a compressed bitmap, such as a traffic identification map (TIM) as described above. The paging message 2400 may be similar to any one of the paging messages 302a, 302b, or 302c. As shown, the paging message 2400 includes an EID field 2405, a LEN field 2410, a control field 2415, and one or more sub-bitmap elements 2420. The control field may indicate the type of compression used. The one or more sub-bitmap elements 2420 may be sent in a paging message within a single paging message in order to cover multiple STAs.

FIG. 24b illustrates the structure of one of sub-bitmap elements 2420. In particular, a first field 2421 indicates an offset value which is used to identify the index of a paged STA. In one aspect, the first field is formed of 13 bits. For example, the paged STA index may be computed as a sum of the offset value and the bit position in the variable-length bitmap 2423. A second field 2422 identifies the length of the variable-length bitmap 2423. The length is indicated in bytes. In one aspect, the second field is formed of 3 bits. If the value of the length is equal to zero, then the only STA that is paged is the STA with index equal to the offset value contained in field 2421. If the value of the length is greater than zero, then the value of the length indicates the number of bytes in the variable-length bitmap 2423. A third field 2423 identifies the variable-length bitmap. The variable-length bitmap is of variable length because trailing zeros can be omitted and assumed to be implicitly zeros (unless another sub-bitmap element 2420 indicates otherwise). In one aspect, the length of the variable-length bitmap 2423 can be from 0 bytes to 7 bytes. In another aspect, the value indicated by the length field may be mapped to different lengths of the variable length bitmap. For example, 0 may indicate that the variable length bit map is not present, 1 may indicate that the variable length bitmap is 1 byte, 2 may indicate that the variable length bitmap is 4 bytes, 3 may indicate that the variable length is 8 bytes, etc.

FIG. 25a illustrates another exemplary paging message 2500 with a compressed bitmap, such as a traffic identification map (TIM) as described above. By way of example, and not limitation, this paging message 2500 can be used with a low-density bitmap (e.g., a bitmap in which the number of ones is greatly less than the number of zeros). The paging message 2500 may be similar to the paging message 302b. As shown, the paging message 2500 includes an EID field 2505, a LEN field 2510, a control field 2515, and a compressed TIM Information Element (TIM IE) 2520. The control field may indicate the type of compression used.

Figure 25B:
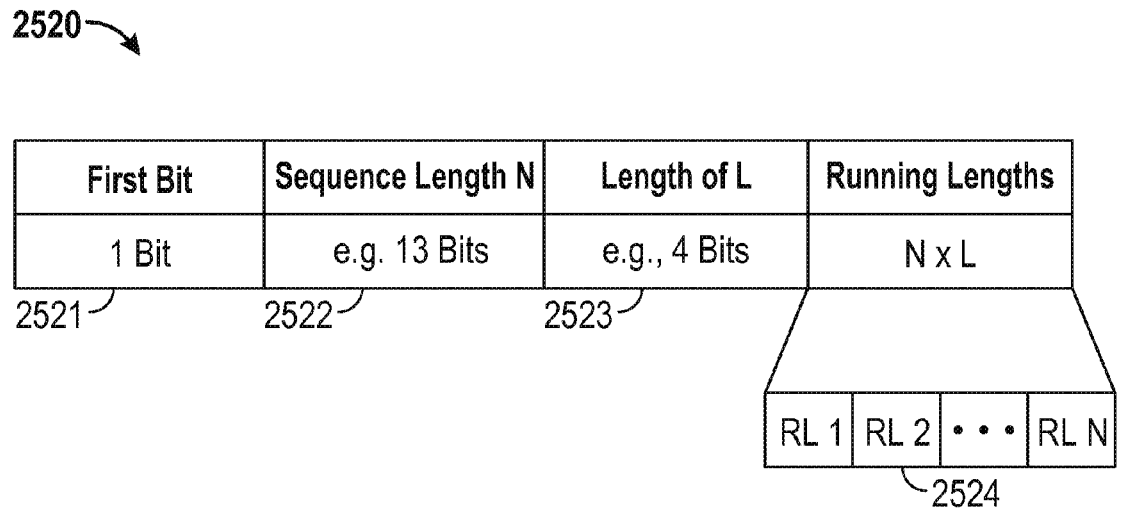

FIG. 25b illustrates the structure of the compressed TIM IE 2520. The structure employs running length sequences obtained by use of a running-length encoding (RLE) method to process the original bitmap. In particular, a first field 2521 indicates the value of the first bit in the sequence of a bitmap to be compressed. This value may be either "1" or "0". A second field 2522 indicates the number N of running length sequences (e.g., N=$2^n$, where n is the number of bits forming second field 2522). In one aspect, second field 2522 is formed of n=13 bits (in this way, N can cover at least up to 6000). A third field 2523 indicates the number of bits L of each running length sequence (e.g., L=$2^l$, where l is the number of bits forming third field 2523). In one aspect, third field 2523 is formed of l=4 bits. A fourth field 2524 includes the running lengths sequences. The total number of bits forming fourth field 2524 is N*L. In one aspect, the number of bits L can be selected as L=ceil($\log_2$ R), where R=max ([r1, r2, . . . , rN]), with [r1, r2, . . . , rN] corresponding to the sequence of the N running length sequences. From this compressed TIM IE, the STAs can losslessly reconstruct the original bitmap.

Figure 26:
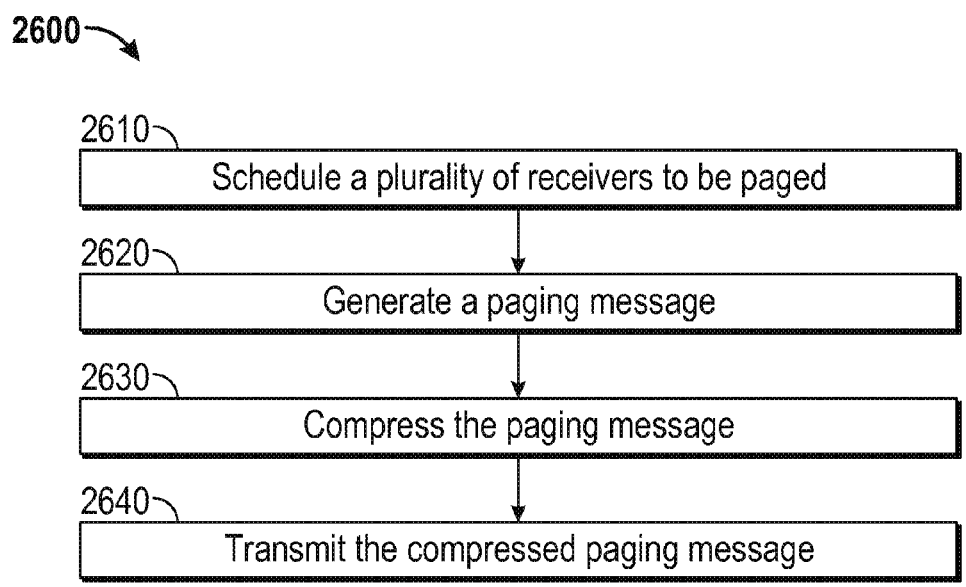
FIG. 26 illustrates a method for compressing the paging message.

FIG. 26 illustrates a method 2600 for compressing any one of the paging messages 302a, 302b, or 302c. By way of example, and not limitation, possible compressed paging message 302a, 302b, or 302c obtained by this method are paging messages 1800, 1900, 2000, 2100, 2400 or 2500, as described above. At block 2610, a transmitting device (e.g., the AP 104 or an apparatus associated with the AP 104) schedules a plurality of receivers to be paged (e.g., the STAs 106). At block 2620, the transmitting device generates a paging message; said paging message identifying one or more of the plurality of scheduled receivers. At block 2630, the transmitting device compresses the paging message. Various methods can be employed for performing the compression. At block 2640, the transmitting device transmits the compressed paging message to the one or more of the plurality of scheduled receivers. In certain situations (e.g., by way of example, and not limitation, with high-density bitmap in which the number of zeros is much less than the number of ones) the transmitting device can choose a fraction (or subgroup, or subset) of the plurality of receivers to be paged for inclusion in the paging message. The scheduling of the plurality of devices may be done, for example, in a round robin manner (not shown). The method 2600 as illustrated in FIG. 26 may coexist with any of the methods and processes discussed herein. Also, all or part of method 2600 as illustrated in FIG. 26 may be combined with any of the methods or processes discussed herein.

FIG. 27a illustrates a method 2700 of compressing the paging message 2400 as illustrated in FIG. 24a and FIG. 24b. At block 2705, the transmitting device (e.g., the AP 104 or an apparatus associated with the AP 104) defines a sub-bitmap element 2420. At block 2710 the transmitting device inserts in sub-bitmap element 2420 information directed at identifying the index of a paged receiver (e.g., STA 106). The information can be, for example, in the form of fields 2421 and 2422 as described above. At block 2715 the transmitting device inserts in sub-bitmap element 2420 a variable-length bitmap 2423. At block 2720 the transmitting device transmits one or more of sub-bitmap elements 2420 in a single paging message within a single TIM frame. This may be done in order to cover multiple STAs within a single frame. The method of FIG. 27a may coexist with any of the methods and processes discussed herein. By way of example, and not limitation, the method 2700 may include the compression of block 2630 of method 2600 described herein.

FIG. 27b illustrates a method 2750 of compressing the paging message 2500 as illustrated in FIG. 25a and FIG. 25b. At block 2755, the transmitting device (e.g., the AP 104 or an apparatus associated with the AP 104) receives a bitmap to be compressed. The bitmap may be similar to the bitmap as described above. At block 2760, the transmitting device compresses the bitmap by obtaining running-length sequences. The sequences can be obtained by using the well-known running-length encoding (RLE) method. At block 2765, the transmitting device defines an information element, such as compressed TIM IE 2520. At block 2770, the transmitting device inserts in the information element as defined in block 2765 the running length sequences obtained in block 2760. At block 2775, the transmitting device inserts in the information element as defined in block 2765 information relative to the running length sequences obtained in block 2760. By way of example, and not limitation, such information can comprise the information contained in field 2521, field 2522 and field 2523 as described above. Such method can be used, for example, with a low-density bitmap (e.g., a bitmap in which the number of ones is much less than the number of zeros). However, it is to be understood that this is not the only use, and the person skilled in the art could use this method in any other suitable situation.

Figure 28:
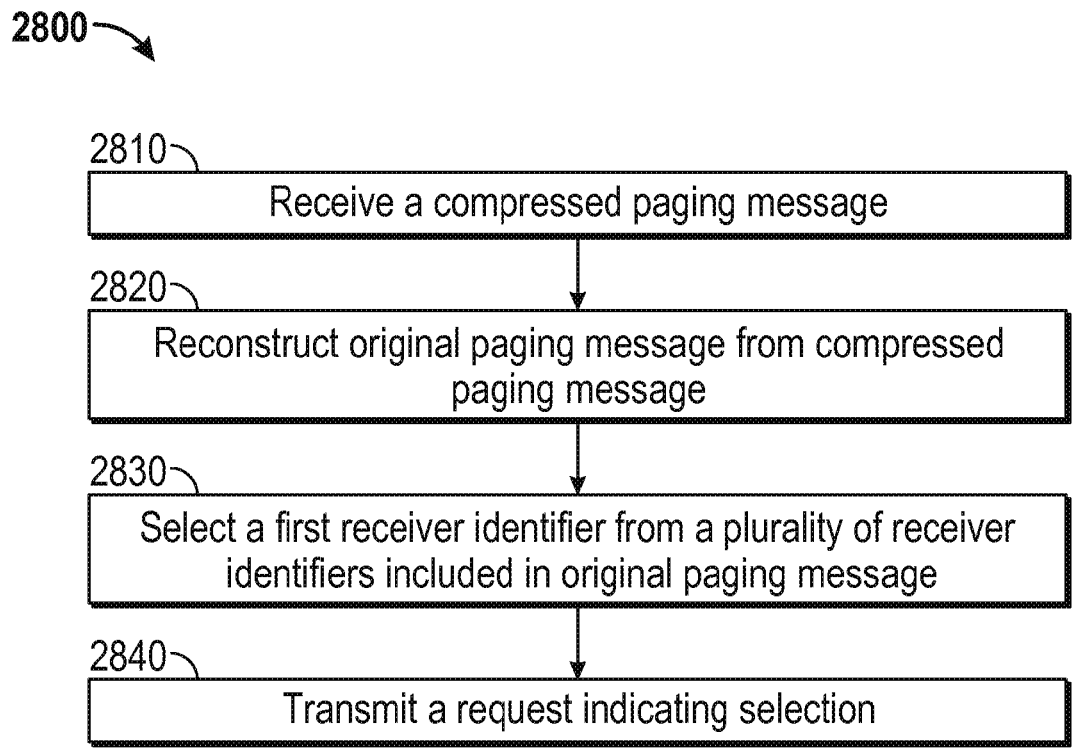
FIG. 28 illustrates a method of receiving a compressed paging message.

FIG. 28 illustrates a method 2800 of receiving any one of compressed paging messages 302a, 302b, or 302c. By way of example, and not limitation, possible compressed paging message 302a, 302b, or 302c received by this method are paging messages 1800, 1900, 2000, 2100, 2400 or 2500, as described above. At block 2810, the receiver (e.g., STA 106) receives a compressed paging message from a transmitting device (e.g., the AP 104 or an apparatus associated with the AP 104). At block 2820, the receiver reconstructs the original paging message from the compressed paging message. The method of reconstructing the original paging message may depend on the method used for compressing said original paging message. At block 2830, the receiver selects a first receiver identifier from a plurality of receiver identifiers that are included in the original paging message. At block 2840, the receiver transmits a request to the transmitting device indicating selection of the first receiver identifier. The method 2800 as illustrated in FIG. 28 may coexist with any of the methods and processes discussed herein. Also, all or part of method 2800 as illustrated in FIG. 28 may be combined with any of the methods or processes discussed herein.

In one aspect, the bitmap control field may include an 'inverse bitmap' indication. The inverse bitmap indication may indicate whether the compressed TIM bitmap is conveyed in a direct or inverse form. When the inverse bitmap indication indicates that the TIM bitmap is conveyed in a direct form, the TIM bitmap is compressed using any of the methods described herein. When the inverse bitmap indication indicates that the TIM bitmap is conveyed in an inverse form, the compressed TIM bitmap indicates the STAs 106 that are not paged. All the STAs 106 not indicated in the compressed TIM bitmap are paged STAs 106. One of the possible advantages of having a direct form and an indirect form for conveying the compressed TIM bitmap is that, in certain situations, the number of STAs that are not paged is larger than the number of STAs that are paged, and therefore the size of the compressed TIM bitmap may be smaller.

In one aspect, when the inverse bitmap indication indicates that the TIM bitmap is compressed in an inverse form, the TIM bitmap compression is performed as follows. The lowest AID indicated in the paging message indicates a first paged STA 106. All the STAs 106 with an AID lower than the lowest AID indicated in the paging message are assumed to be not paged (first set of not paged STAs 106). The highest AID indicated in the paging message indicates a second paged STA 106. All the STAs 106 with an AID higher than the highest AID indicated in the paging message are assumed to be not paged (second set of not paged STAs 106). All the STAs 106 indicated in the paging message, excluding the ones with the lowest and highest AID, are not paged (third set of not paged STAs 106). Accordingly, the complete set of not paged STAs 106 is the union of the first set of not paged STAs 106, the second set of not paged STAs 106, and the third set of not paged STAs 106. All the STAs 106 that are not included in the complete set of not paged STAs 106 are paged STAs 106. For ease of processing, the STA with lowest AID may be indicated first in the message and the STA with highest AID may be indicated last.

In another aspect, when the inverse bitmap indication indicates that the TIM bitmap is compressed in an inverse form, the TIM bitmap compression is performed as follows. The lowest AID indicated in the paging message indicates a first not paged STA 106. All the STAs 106 with an AID lower than the lowest AID indicated in the paging message are assumed to be not paged (first set of not paged STAs 106). The highest AID indicated in the paging message indicates a second not paged STA 106, and all the STAs 106 with an AID higher than the highest AID indicated in the paging message are assumed to be not paged (second set of not paged STAs 106). All the STAs 106 indicated in the paging message, besides the ones with the lowest and highest AID, are also not paged (third set of not paged STAs 106). Accordingly, the complete set of not paged STAs 106 is the union of the first not paged STA 106, the second not paged STA 106, the first set of not paged STAs 106, the second set of not paged STAs 106, and the third set of not paged STAs 106. All the STAs 106 that are not included in the complete set of not paged STAs 106 are paged STAs 106.

In yet another aspect, when the inverse bitmap indication indicates that the TIM bitmap is compressed in an inverse form, the TIM bitmap compression is performed as follows. The lowest AID indicated in the paging message indicates a first paged STA 106. All the STAs 106 with an AID lower than the lowest AID indicated in the paging message are assumed to be not paged (first set of not paged STAs 106). The highest AID indicated in the paging message indicates a first not paged STA 106. All the STAs 106 with an AID higher than the highest AID indicated in the paging message are assumed to be not paged (second set of not paged STAs 106). All the STAs 106 indicated in the paging message, besides the ones with the lowest and highest AID, are not paged (third set of not paged STAs 106). Accordingly, the complete set of not paged STAs 106 is the union of the first not paged STA 106, the first set of not paged STAs 106, the second set of not paged STAs 106, and the third set of not paged STAs 106. All the STAs 106 that are not included in the complete set of not paged STAs 106 are paged STAs 106.

In yet another aspect, when the inverse bitmap indication indicates that the TIM bitmap is compressed in an inverse form, the TIM bitmap compression is performed as follows. The lowest AID indicated in the paging message indicates a first not paged STA 106. All the STAs 106 with an AID lower than the lowest AID indicated in the paging message are assumed to be not paged (first set of not paged STAs 106). The highest AID indicated in the paging message indicates a first paged STA 106. All the STAs 106 with an AID higher than the highest AID indicated in the paging message are assumed to be not paged (second set of not paged STAs 106). All the STAs 106 indicated in the paging message, besides the ones with the lowest and highest AID, are not paged (third set of not paged STAs 106). Accordingly, the complete set of not paged STAs 106 is the union of the first not paged STA 106, the first set of not paged STAs 106, the second set of not paged STAs 106, and the third set of not paged STAs 106. All the STAs 106 that are not included in the complete set of not paged STAs 106 are paged STAs 106.

Figure 29:
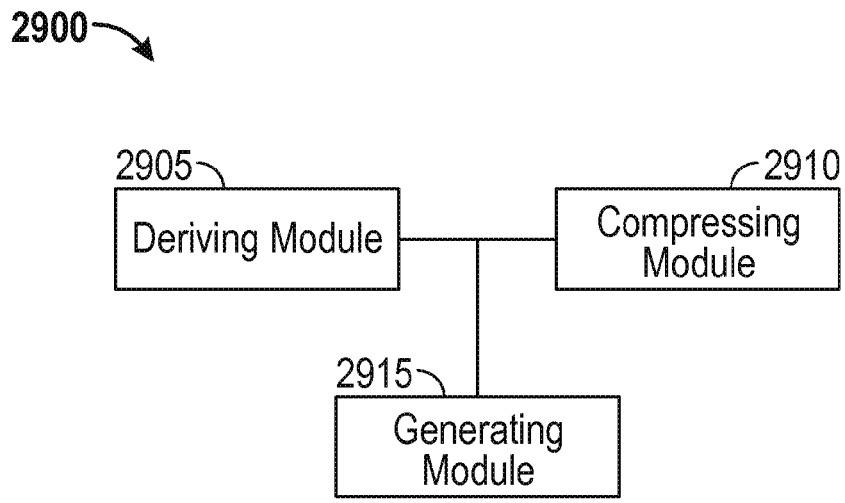
FIG. 29 is a functional block diagram of an exemplary wireless device that may be employed within the wireless communication system of FIG. 1.

FIG. 29 is a functional block diagram of an exemplary wireless device 2900 that may be employed within the wireless communication system of FIG. 1. The wireless device 2900 may include a deriving module 2905 configured to derive a first information sub-unit from a first information unit associated with a paging message. The deriving module 2905 may be configured to perform one or more functions discussed above with respect to block 2210 of FIG. 22. The deriving module 2905 may correspond to processor 204. The wireless device 2900 may further include a compressing module 2910 configured to compress the first information sub-unit according to a first method of compression to obtain a first compressed information sub-unit. The compressing module 2910 may be configured to perform one or more functions discussed above with respect to block 2220 of FIG. 22. The compressing module 2910 may correspond to processor 204. The wireless device 2900 may further include a generating module 2915 configured to generate a second information unit associated with the first method of compression. The generating module 2915 may be configured to perform one or more functions discussed above with respect to block 2230 of FIG. 22. The generating module 2915 may correspond to processor 204.

Moreover, in one aspect, means for deriving the first information sub-unit may comprise the deriving module 2905. In another aspect, means for compressing the first information sub-unit may comprise the compressing module 2910. In yet another aspect, means for generating the second information unit may comprise the generating module 2915.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication comprising:
 a processor configured to:
  generate a first information sub-unit, the first information sub-unit including a bitmap having a plurality of bits, at least one of the plurality of bits indicating that the apparatus has data buffered to transmit to a first wireless device of a plurality of wireless devices,
  compress the first information sub-unit according to a first method of compression to obtain a first compressed information sub-unit, and
  generate a second information unit associated with the first method of compression; and
 a transceiver configured to transmit a paging message, the paging message including the first compressed information sub-unit and the second information unit.

2. The apparatus of claim 1, wherein the paging message comprises a sub-unit length field configured to indicate a length of the first compressed information sub-unit.

3. The apparatus of claim 1, wherein the first information sub-unit is derived from a first information unit, and the processor is further configured to:
 derive a second information sub-unit from the first information unit;
 compress the second information sub-unit according to a second method of compression to obtain a second compressed information sub-unit; and
 generate a third information unit associated with the second method of compression.

4. The apparatus of claim 3, wherein the paging message includes the first compressed information sub-unit, the second compressed information sub-unit, the second information unit, and the third information unit.

5. The apparatus of claim 3, wherein the first method of compression is the same as the second method of compression.

6. The apparatus of claim 3, wherein the second information unit includes an identification of the first method of compression.

7. The apparatus of claim 3, wherein the second information unit includes an indication of an offset size associated with the first compression method, the offset size indicating an identifier of the first wireless device.

8. The apparatus of claim 3, wherein the second information unit includes an indication of a cardinality associated with the first information unit.

9. The apparatus of claim 3, wherein the paging message comprises a sub-unit length field configured to indicate an individual length of the first compressed information sub-unit and the second compressed information sub-unit.

10. A method of wireless communications comprising:
generating a first information sub-unit, the first information sub-unit including a bitmap having a plurality of bits, at least one of the plurality of bits indicating that an access point has data buffered to transmit to a first wireless device of a plurality wireless devices;
compressing the first information sub-unit according to a first method of compression to obtain a first compressed information sub-unit;
generating a second information unit associated with the first method of compression; and
transmitting a paging message, the paging message including the first compressed information sub-unit and the second information unit.

11. The method of claim 10, wherein the paging message comprises a sub-unit length field configured to indicate a length of the first compressed information sub-unit.

12. The method of claim 10, wherein the first information sub-unit is derived from a first information unit, the method further comprising:
deriving a second information sub-unit from the first information unit, the second information sub-unit indicating that the access point has data buffered to transmit to at least a second wireless device of the plurality of wireless devices;
compressing the second information sub-unit according to a second method of compression to obtain a second compressed information sub-unit; and
generating a third information unit associated with the second method of compression.

13. The method of claim 12, wherein the paging message includes the first compressed information sub-unit, the second compressed information sub-unit, the second information unit, and the third information unit.

14. The method of claim 12, wherein the first method of compression is the same as the second method of compression.

15. The method of claim 12, wherein the second information unit includes an identification of the first method of compression.

16. The method of claim 12, wherein the second information unit includes an indication of an offset size associated with the first method of compression, the offset size indicating an identifier of the first wireless device.

17. The method of claim 12, wherein the second information unit includes an indication of a cardinality associated with the first information unit.

18. The method of claim 12, wherein the paging message comprises a sub-unit length field configured to indicate an individual length of the first compressed information sub-unit and the second compressed information sub-unit.

19. An apparatus for wireless communication comprising:
means for generating a first information sub-unit, the first information sub-unit including a bitmap having a plurality of bits, at least one of the plurality of bits indicating that the apparatus has data buffered to transmit to a first wireless device of a plurality of wireless devices;
means for compressing the first information sub-unit according to a first method of compression to obtain a first compressed information sub-unit;
means for generating a second information unit associated with the first method of compression; and
means for transmitting a paging message, the paging message including the first compressed information sub-unit and the second information unit.

20. A non-transitory computer-readable medium comprising instructions that when executed cause an apparatus to:
generate a first information sub-unit, the first information sub-unit including a bitmap having a plurality of bits, at least one of the plurality of bits indicating that an access point has data buffered to transmit to a first wireless device of a plurality of wireless devices;
compress the first information sub-unit according to a first method of compression to obtain a first compressed information sub-unit;
generate a second information unit associated with the first method of compression; and
transmit a paging message, the paging message including the first compressed information sub-unit and the second information unit.

21. The apparatus of claim 1, further comprising a memory configured to store the first compressed information sub-unit and the second information unit.

22. The apparatus of claim 1, wherein the first method of compression is based on one or more sequential bits in the bitmap having a same bit value.

* * * * *